(12) United States Patent
Sannodo et al.

(10) Patent No.: US 10,024,878 B2
(45) Date of Patent: Jul. 17, 2018

(54) DECELERATING FACTOR ESTIMATING DEVICE

(75) Inventors: Shinya Sannodo, Susono (JP); Hirotada Otake, Sunto-gun (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 836 days.

(21) Appl. No.: 14/376,273

(22) PCT Filed: Feb. 3, 2012

(86) PCT No.: PCT/JP2012/052558
§ 371 (c)(1),
(2), (4) Date: Aug. 1, 2014

(87) PCT Pub. No.: WO2013/114626
PCT Pub. Date: Aug. 8, 2013

(65) Prior Publication Data
US 2015/0019158 A1   Jan. 15, 2015

(51) Int. Cl.
*G01P 15/00* (2006.01)
*B60W 30/14* (2006.01)
(Continued)

(52) U.S. Cl.
CPC ........... *G01P 15/00* (2013.01); *B60W 30/143* (2013.01); *B60W 30/18109* (2013.01);
(Continued)

(58) Field of Classification Search
CPC ...................................................... G01P 15/00
(Continued)

(56) References Cited

U.S. PATENT DOCUMENTS

| 4,735,114 A | 4/1988 | Satoh et al. |
| 6,208,926 B1 * | 3/2001 | Wagner .................... B60T 7/22 303/169 |

(Continued)

FOREIGN PATENT DOCUMENTS

| DE | 197 28 867 A1 | 1/1999 |
| DE | 101 44 699 A1 | 4/2002 |

(Continued)

OTHER PUBLICATIONS

International Search Report dated Feb. 28, 2012 in PCT/JP12/052558 Filed Feb. 3, 2012.

(Continued)

*Primary Examiner* — Ricky Ngon
(74) *Attorney, Agent, or Firm* — Oblon, McClelland, Maier & Neustadt, L.L.P.

(57) ABSTRACT

A decelerating factor estimating device configured to estimate a decelerating factor of a vehicle includes a drive force acquiring unit configured to acquire a drive force of the vehicle; a vehicle speed acquiring unit configured to acquire a vehicle speed of the vehicle; an acceleration acquiring unit configured to acquire an acceleration of the vehicle; and a decelerating factor estimating unit configured to estimate a plurality of decelerating factors based on a relationship of the acquired drive force, speed, and acceleration, wherein the decelerating factor estimating unit determines a type of the decelerating factor to estimate based on a traveling state of the vehicle.

20 Claims, 9 Drawing Sheets

(51) Int. Cl.
   *B60W 30/18*   (2012.01)
   *G01G 9/00*    (2006.01)
   *B60W 40/10*   (2012.01)

(52) U.S. Cl.
   CPC ........... *G01G 9/00* (2013.01); *B60W 40/1005* (2013.01); *B60W 2520/10* (2013.01); *B60W 2520/105* (2013.01); *B60W 2530/10* (2013.01); *B60W 2530/16* (2013.01); *B60W 2550/22* (2013.01); *B60W 2550/40* (2013.01); *B60W 2550/402* (2013.01); *B60W 2720/106* (2013.01)

(58) Field of Classification Search
   USPC ......................................................... 702/141
   See application file for complete search history.

(56) References Cited

U.S. PATENT DOCUMENTS

| | | | |
|---|---|---|---|
| 6,347,269 | B1 | 2/2002 | Hayakawa et al. |
| 2004/0048118 | A1 | 3/2004 | Nakaji et al. |
| 2004/0107082 | A1* | 6/2004 | Sato .................... B60T 8/17551 703/8 |
| 2005/0000305 | A1 | 1/2005 | Yamada et al. |
| 2005/0010356 | A1 | 1/2005 | Ishiguro et al. |
| 2007/0173372 | A1* | 7/2007 | Ueno ....................... B60K 6/48 477/3 |
| 2008/0255732 | A1 | 10/2008 | Yasui et al. |
| 2009/0043428 | A1 | 2/2009 | Matsunaga et al. |
| 2009/0112386 | A1 | 4/2009 | Saitoh et al. |
| 2010/0023296 | A1* | 1/2010 | Huang .................. B60W 40/09 702/141 |
| 2010/0250042 | A1 | 9/2010 | Shamoto |
| 2011/0066376 | A1* | 3/2011 | Takaoka ................. G01C 21/16 701/500 |
| 2011/0130931 | A1 | 6/2011 | Yoshikawa et al. |
| 2011/0241865 | A1 | 10/2011 | Saito |

FOREIGN PATENT DOCUMENTS

| | | |
|---|---|---|
| EP | 1 215 071 A1 | 6/2002 |
| EP | 1 298 020 A1 | 4/2003 |
| GB | 2 336 683 A | 10/1999 |
| JP | 2002-081989 A | 3/2002 |
| JP | 2007 271282 | 10/2007 |
| JP | 2011-016465 A | 1/2011 |

OTHER PUBLICATIONS

Notice of Allowance dated Jul. 26, 2017 in U.S. Appl. No. 14/368,894.

Office Action dated Feb. 24, 2017 in co-pending U.S. Appl. No. 14/368,894.

* cited by examiner

DECELERATING FACTOR ESTIMATING DEVICE

FIELD

The present invention relates to a decelerating factor estimating device.

BACKGROUND

A drive assisting device that is mounted on a vehicle to assist the traveling of the vehicle is conventionally known. The drive assisting device determines the behavior of the vehicle based on various properties of the vehicle to assist the traveling of the vehicle. The various properties of the vehicle include properties that fluctuate according to the conditions at the time of traveling. A device for detecting the properties of the vehicle that fluctuate includes, for example, a device described in Patent Literature 1. Patent Literature 1 describes a device that estimates the weight of the vehicle. Patent Literature 1 also describes prohibiting the computation of the weight of the vehicle (estimation of the vehicle weight) when the vehicle speed exceeds a predetermined vehicle speed.

CITATION LIST

Patent Literature

Patent Literature 1: Japanese Patent Application Laid-open No. 2007-271282

SUMMARY

Technical Problem

The properties of the vehicle include properties associated with deceleration, that is, properties that become a resistance in traveling at the time of traveling. The vehicle can calculate such decelerating factors and carry out various types of controls based on the calculation result to appropriately control the vehicle. The decelerating factors of the vehicle include factors that fluctuate according to the conditions at the time of traveling. The decelerating factors of the vehicle that fluctuate according to the conditions at the time of traveling include the vehicle weight described in Patent Literature 1. Each decelerating factor is estimated by calculating the various types of conditions in Patent Literature 1, but the estimated decelerating factor and the actual decelerating factor may be deviated and the accuracy of estimation may lower. Further, a long time is required until the estimation of the vehicle weight is completed if the estimation of the vehicle weight is prohibited when the vehicle speed exceeds a predetermined value as in the device described in Patent Literature 1.

In light of the foregoing, it is an object of the present invention to provide a decelerating factor estimating device that can estimate the decelerating factor at higher accuracy and in a short period of time.

Solution to Problem

In order to achieve the above mentioned object, a deceleration factor estimating device according to the present invention that estimates a deceleration factor of a vehicle, the deceleration factor estimating device includes a drive force acquiring unit configured to acquire a drive force of the vehicle; a vehicle speed acquiring unit configured to acquire a vehicle speed of the vehicle; an acceleration acquiring unit configured to acquire an acceleration of the vehicle; and a decelerating factor estimating unit configured to estimate a plurality of decelerating factors based on a relationship among the acquired drive force, the acquired speed, and the acquired acceleration, wherein the decelerating factor estimating unit determines a type of the decelerating factor to be estimated based on a traveling state of the vehicle, and at the time an estimated value of a first decelerating factor is converging, further widens a range of the traveling state of the vehicle to execute an estimation process of a second decelerating factor than a case where the estimated value of the first decelerating factor is not converging.

Here, it is preferable that the first decelerating factor is an air resistance coefficient, the second decelerating factor is a vehicle weight, the decelerating factor estimating unit estimates the vehicle weight at the time the vehicle speed is smaller than a threshold value, and at the time the air resistance coefficient is converging, the decelerating factor estimating device makes a speed of the threshold value a higher speed than a case where the air resistance coefficient is not converging.

Further, it is preferable that the first decelerating factor is a vehicle weight, the second decelerating factor is an air resistance coefficient, the decelerating factor estimating unit estimates the air resistance coefficient at the time the acceleration is smaller than a threshold value, and at the time the vehicle weight is converging, the decelerating factor estimating device makes an acceleration of the threshold value a higher acceleration than a case where the vehicle weight is not converging.

Further, it is preferable that the first decelerating factor is an air resistance coefficient, the second decelerating factor is a road load, the decelerating factor estimating unit estimates the road load at the time the vehicle speed is smaller than a threshold value, and at the time the air resistance coefficient is converging, the decelerating factor estimating device makes a vehicle speed of the threshold value a higher vehicle speed than a case where the air resistance coefficient is not converging.

Further, it is preferable that the first decelerating factor is a vehicle weight, the second decelerating factor is a road load, the decelerating factor estimating unit estimates the road load at the time the acceleration is smaller than a threshold value, and at the time the vehicle weight is converging, the decelerating factor estimating device makes an acceleration of the threshold value a higher acceleration than a case where the vehicle weight is not converging.

Further, it is preferable that the decelerating factor estimating unit stops the estimation of at least one of the air resistance coefficient and the road load of the decelerating factors at the time the vehicle weight is greater than or equal to the threshold value.

Further, it is preferable to further include a vehicle behavior stability control detecting unit configured to detect actuation of a vehicle behavior stability control, wherein the decelerating factor estimating unit preferably stops the estimation of the decelerating factor at the time the vehicle behavior stability control detecting unit detects that the vehicle behavior stability control is actuated.

Further, it is preferable that the decelerating factor estimating unit determines one decelerating factor to be estimated based on the vehicle speed and the acceleration.

Further, it is preferable that the decelerating factor includes a vehicle weight, an air resistance coefficient, and a road load, and the decelerating factor estimating unit analyzes a relationship among the decelerating factor, the drive force, the speed, and the acceleration using a motion equation, and estimates the decelerating factor.

Advantageous Effects of Invention

The decelerating factor estimating device according to the present invention has an effect of being able to estimate the decelerating factor at high accuracy and in a short period of time.

DESCRIPTION OF EMBODIMENTS

An embodiment according to the present invention will be hereinafter described in detail based on the drawings. The present invention is not limited by such embodiment. The configuring elements in the following embodiment include elements that are easily replaceable by those skilled in the art or elements that are substantially the same.

Figure 1:
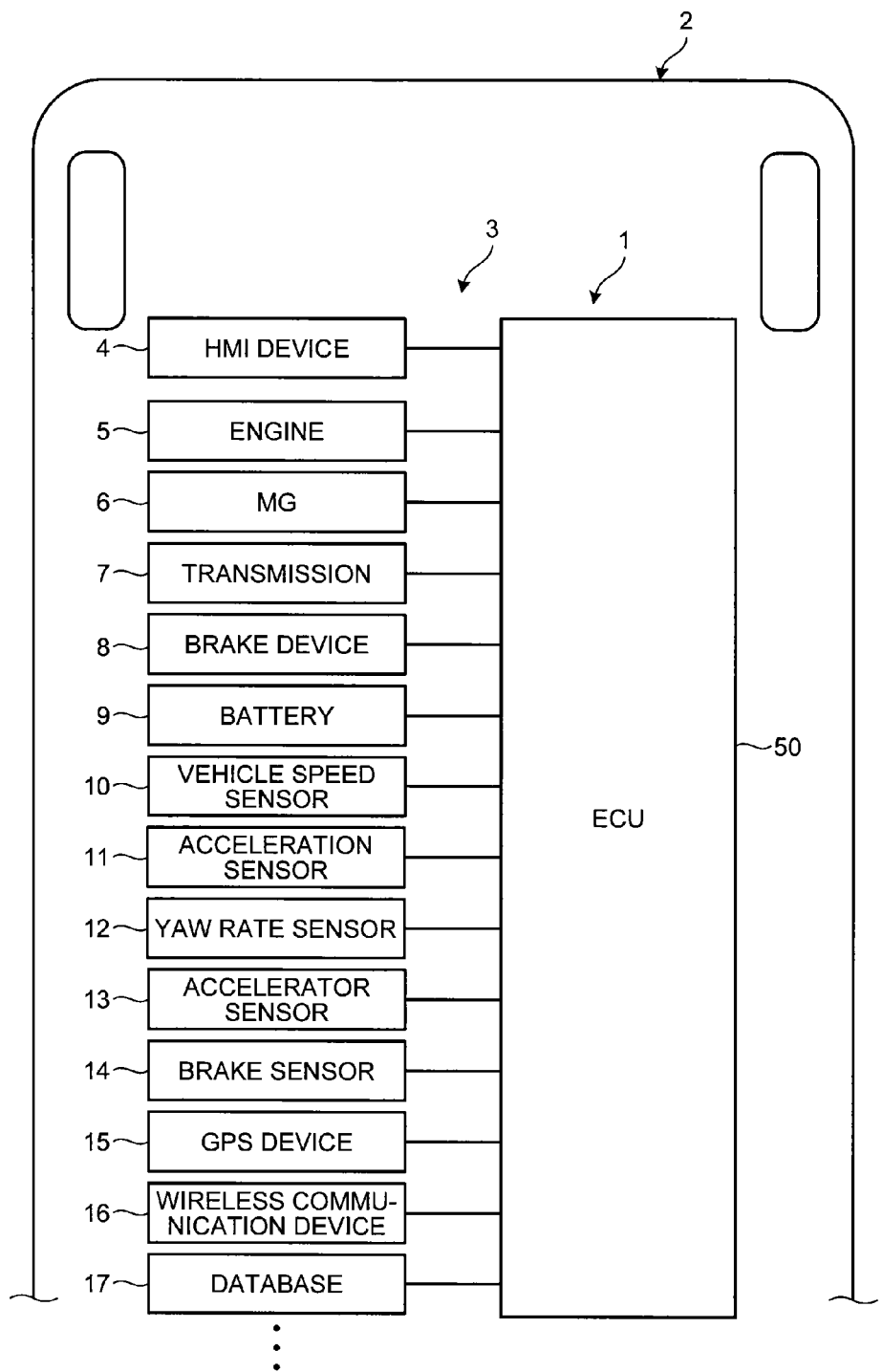
FIG. 1 is a schematic configuration diagram illustrating a vehicle control system.
Figure 2:
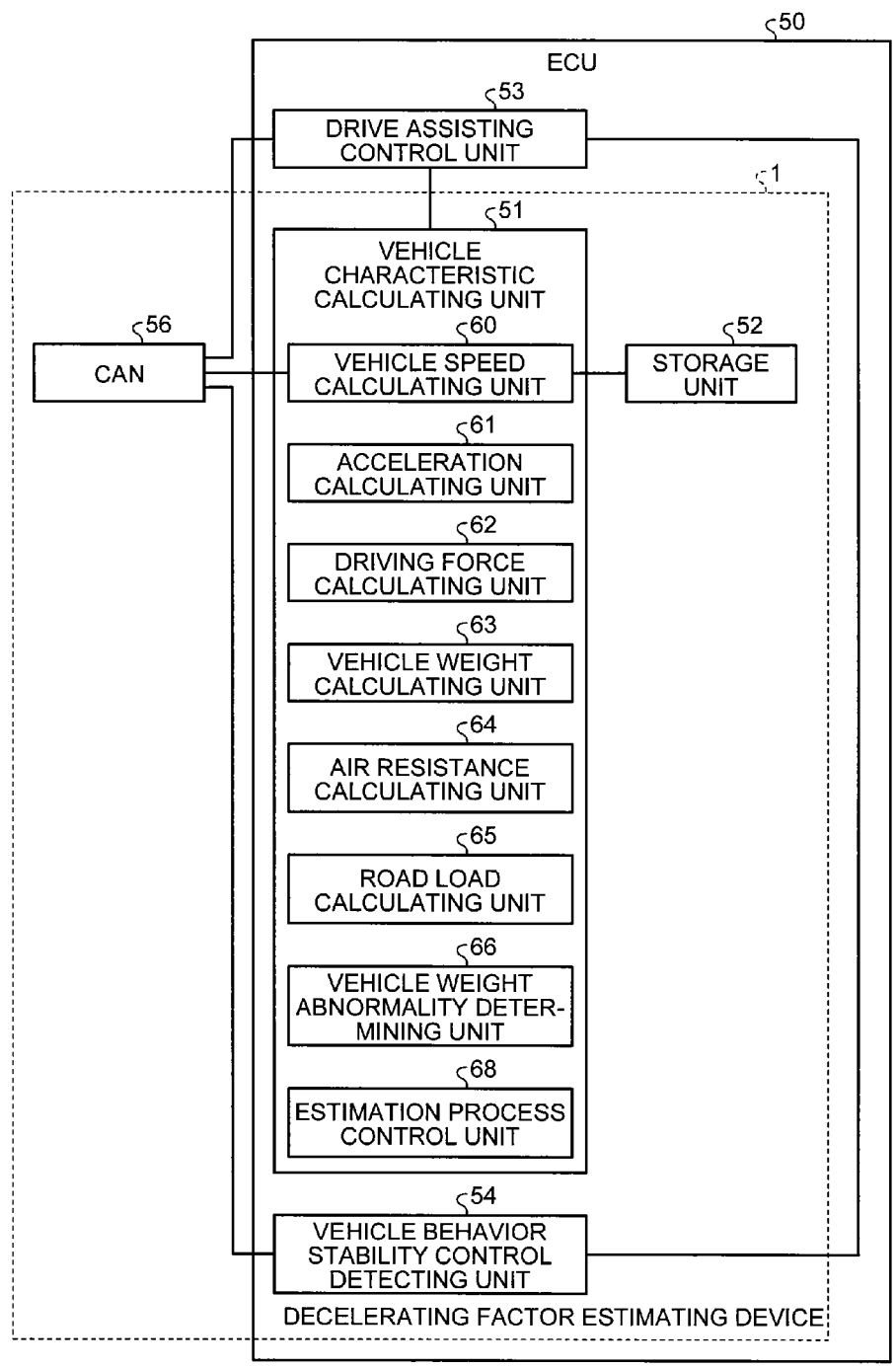
FIG. 2 is a block diagram illustrating one example of a schematic configuration of an ECU and a decelerating factor estimating device.

FIG. 1 is a schematic configuration diagram illustrating a vehicle control system, and FIG. 2 is a block diagram illustrating one example of a schematic configuration of an ECU and a decelerating factor estimating device.

A decelerating factor estimating device 1 of the present embodiment is applied to a vehicle control system 3 mounted on a vehicle 2, as illustrated in FIG. 1. The decelerating factor estimating device 1 includes an ECU (Electronic Control Unit) 50. The decelerating factor estimating device 1 estimates the decelerating factor by carrying out various calculations with the ECU 50 according to the situation. The vehicle 2 of the present embodiment estimates a traveling state using the decelerating factor estimated in the decelerating factor estimating device 1 by the ECU 50, and controls an HMI device (assisting device) 4, a drive source (engine 5, MG 6), and the like based on the result to execute various drive assistances to assist the traveling of the vehicle 2.

The vehicle control system 3 of the present embodiment is also a so-called hybrid system that combines the engine 5 and the MG 6 to assume as a traveling drive source for rotatably driving drive wheels of the vehicle 2. In other words, the vehicle 2 is a hybrid vehicle including the MG 6 in addition to the engine 5 as the traveling drive source. The vehicle 2 is configured to drive the engine 5 in as efficient as possible state, and to compensate excess and deficiency of power and engine brake force with the MG 6, which is a rotating electrical machine, and further, carry out regeneration of energy at the time of deceleration to enhance fuel economy.

Specifically, the vehicle control system 3 includes the HMI device 4, the engine 5 serving as an internal combustion engine, a motor generator (hereinafter sometimes referred to as "MG") 6 serving as an electric motor, a transmission 7, a brake device 8, a battery 9, and the like. The vehicle control system 3 also includes a vehicle speed sensor 10, an acceleration sensor 11, a yaw rate sensor 12, an accelerator sensor 13, a brake sensor 14, a GPS (Global Positioning System) device (hereinafter sometimes referred to as "GPS") 15, a wireless communication device 16, a database (hereinafter sometimes referred to as "DB") 17, and the like.

The HMI device 4 is an assisting device capable of outputting drive assistance information, which is information that assists the driving of the vehicle 2, and is a device that provides the drive assistance information to the driver, and the like. The HMI device 4 is an in-vehicle device, and for example, includes a display device (visual information display device), a speaker (sound output device), and the like arranged in a vehicle compartment of the vehicle 2. An existing device, for example, the display device, the speaker and the like of the navigation system may be used for the HMI device 4. The HMI device 4 may provide information by sound information, visual information (figure information, character information), and the like and induce the driving operation of the driver to realize enhancement of fuel economy. The HMI device 4 assists the realization of a target value by the driving operation of the driver by such provision of information. The HMI device 4 is electrically connected to the ECU 50, and is controlled by the ECU 50. The HMI device 4 may be configured to include, for example, tactile information output device that outputs tactile information such as steering wheel vibration, seat vibration, pedal reaction force, and the like.

The vehicle control system 3 is mounted with the engine 5, the MG 6, the transmission 7, the brake device 8, the battery 9, and the like as various actuators for realizing the travelling of the vehicle 2.

The engine 5 acts a drive force on the drive wheels of the vehicle 2 in response to an acceleration request operation by the driver, for example, a depressing operation of an accelerator pedal. The engine 5 consumes fuel and generates an engine torque serving as an engine torque as a power for traveling to be acted on the drive wheels of the vehicle 2. That is, the engine 5 is a heat engine that outputs the heat energy generated by combusting fuel in the form of a mechanical energy such as a torque, and includes a gasoline engine, diesel engine, LPG engine, and the like. The engine 5 includes, for example, a fuel injection device, an ignition device, a throttle valve device, and the like (not illustrated), which devices are electrically connected to the ECU 50 and controlled by the ECU 50. The engine 5 has the output torque controlled by the ECU 50. The power generated by the engine 5 may be used for power generation in the MG 6.

The MG 6 acts the drive force on the wheels of the vehicle 2 in response to the acceleration request operation by the driver, for example, the depressing operation of the accelerator pedal. The MG 6 converts an electrical energy to a mechanical power and generates a motor torque as a power for traveling to be acted on the drive wheels of the vehicle 2. The MG 6 is a so-called rotating electrical machine including a stator, which is a stator, and a rotor, which is a rotor. The MG 6 is an electric motor that converts the electrical energy to the mechanical power and outputs the same, and is also a power generator that converts the mechanical power to the electrical energy and collects the same. In other words, the MG 6 has a function (power running function) of an electric motor that is driven by the supply of power to convert the electrical energy to the machine energy and output the same, and a function (regenerating function) of a power generator that converts the machine energy to the electrical energy. The MG 6 is electrically connected to the ECU 50 through an inverter, and the like that carries out conversion of DC current and AC current, and is controlled by the ECU 50. The MG 6 has the output torque and the power generation amount controlled through the inverter by the ECU 50.

The transmission 7 is a power transmitting device that speed-changes the rotation output by the engine 5 and the MG 6 and transmits the same toward the drive wheels of the vehicle 2. The transmission 7 may be a so-called manual transmission (MT), or a so-called automatic transmission such as a stepped automatic transmission (AT), a continuously variable transmission (CVT), a multi-mode manual transmission (MMT), a sequential manual transmission (SMT), a dual clutch transmission (DCT), and the like. The transmission 7 will be described herein as the continuously variable transmission using, for example, a planetary gear mechanism, and the like. The transmission 7 has a transmission actuator, and the like electrically connected to the ECU 50 and controlled by the ECU 50.

The brake device 8 acts a brake force on the wheels of the vehicle 2 in response to a brake request operation by the driver, for example a depressing operation of a brake pedal. The brake device 8 exerts the brake force on the wheels, which are rotatably supported by the vehicle body of the vehicle 2, by generating a predetermined friction force (friction resistance force) between friction elements such as a brake pad, a brake disk, and the like, for example. The brake device 8 generates the brake force at a ground surface with the road surface of the wheels of the vehicle 2 to put a brake on the vehicle 2. The brake device 8 has a brake actuator, and the like electrically connected to the ECU 50 and is controlled by such ECU 50.

The battery 9 is a power accumulating device capable of accumulating electric power (power accumulation) and discharging the accumulated electric power. The battery 9 is electrically connected to the ECU 50, and outputs signals associated with various information to the ECU 50. The battery 9 of the present embodiment detects SOC (State of Charge) as the information on the charged state, and outputs the same to the ECU 50.

When functioning as the electric motor, the MG 6 is supplied with the electric power accumulated in the battery 9 through the inverter, and converts the supplied electric power to the power for traveling of the vehicle 2 and outputs the same. When functioning as the power generator, the MG 6 is driven by the input power to generate power, and charges the generated electric power to the battery 9 through the inverter. In this case, the MG 6 can put a brake (regenerative braking) on the rotation of the rotor by the rotation resistance generated in the rotor. As a result, the MG 6 can cause the rotor to generate a motor regeneration torque, which is a negative motor torque, by the regeneration of electric power at the time of regenerative braking, and can consequently exert the brake force on the drive wheels of the vehicle 2. That is, in the vehicle control system 3, the mechanical power is input from the drive wheel of the vehicle 2 to the MG 6, so that the MG 6 generates power by regeneration, and the motion energy of the vehicle 2 can be collected as the electrical energy. The vehicle control system 3 transmits to the drive wheels the mechanical power (negative motor torque) generated in the rotor of the MG 6 accompanying therewith so that the regenerative braking can be carried out by the MG 6. In this case, in the vehicle control system 3, if the regeneration amount (power generation amount) by the MG 6 is made relatively small, the brake force that generates becomes relatively small and the deceleration that acts on the vehicle 2 becomes relatively small. On the other hand, in the vehicle control system 3, if the regeneration amount (power generation amount) by the MG 6 is made relatively large, the brake force that generates becomes relatively large and the deceleration that acts on the vehicle 2 becomes relatively large.

The vehicle speed sensor 10, the acceleration sensor 11, the yaw rate sensor 12, the accelerator sensor 13, and the brake sensor 14 are state detection devices that detect the traveling state of the vehicle 2 and an input (driver input) with respect to the vehicle 2 by the driver, that is, the state amount and the physical amount associated with the actual operation on the vehicle 2 by the driver. The vehicle speed sensor 10 detects a vehicle speed (hereinafter sometimes referred to as "vehicle speed") of the vehicle 2. The acceleration sensor 11 detects the acceleration of the vehicle 2. The acceleration sensor 11 of the present embodiment detects at least the acceleration in the front and back direction of the vehicle 2. The yaw rate sensor 12 detects the yaw rate of the vehicle 2. The accelerator sensor 13 detects an accelerator opening, which is the operation amount (depressing amount) of the accelerator pedal by the driver. The brake sensor 14 detects the operation amount (depressing amount) of the brake pedal by the driver, for example, the master cylinder pressure, and the like. The vehicle speed sensor 10, the acceleration sensor 11, the yaw rate sensor 12, the accelerator sensor 13, and the brake sensor 14 are electrically connected to the ECU, and output detection signals to the ECU 50.

The GPS device 15 is a device that detects the current position of the vehicle 2. The GPS device 15 receives a GPS signal output by the GPS satellite, and position measures/calculates the GPS information (X coordinate; X, Y coordinate; Y), which is the position information of the vehicle 2, based on the received GPS signal. The GPS device 15 is electrically connected to the ECU 50, and outputs a signal associated with the GPS information to the ECU 50.

The wireless communication device 16 is a read-ahead information acquiring device that acquires read-ahead information associated with the traveling of the vehicle 2 using wireless communication. The wireless communication device 16 acquires the read-ahead information using wireless communication from a road-to-vehicle communication device (road side device) such as a light beacon installed on the road side, an inter-vehicle communication device mounted on another vehicle, a device that exchanges information using communication infrastructure such as Internet through a VICS (registered trademark) (Vehicle Information and Communication System) center, and the like, for example. The wireless communication device 16 acquires, for the read-ahead information, preceding vehicle information, following vehicle information, traffic light information, construction/traffic regulation information, traffic jam information, emergency vehicle information, information related to an accident history database, and the like, for example. For example, the traffic light information includes position information of the traffic light ahead in the traveling direction of the vehicle 2, traffic light cycle information such as a lighting cycle, traffic light change timing of the green light, yellow light, and red light, and the like. The wireless communication device 16 is electrically connected to the ECU 50, and outputs a signal associated with the read-ahead information to the ECU 50.

The database 17 stores various information. The database 17 stores map information including road information, various information and learning information obtained in the actual traveling of the vehicle 2, read-ahead information acquired by the wireless communication device 16, and the like. For example, the road information includes road gradient information, road surface state information, road shape information, limiting vehicle speed information, road curvature (curve) information, stop information, stop line position information, and the like. The information stored in the database 17 is appropriately referenced by the ECU 50, and the necessary information is read out. The database 17 is illustrated to be mounted on the vehicle 2, but is not limited thereto, and may be arranged in an information center, and the like at the vehicle exterior of the vehicle 2, and may have a configuration of being appropriately referenced by the ECU 50 through the wireless communication, and the like and from which the necessary information is read out. The database 17 of the present embodiment accumulates, for the learning information, information of the position (actual stop position) at where the vehicle 2 stopped at the traffic light, intersection, and the like where a reference stop position such as a stop line is provided. The database 17 accumulates the information of the actual stop position for every reference stop position.

The ECU 50 is a control unit that comprehensively controls the entire vehicle control system 3, and is configured as an electronic circuit having a well-known microcomputer including a CPU, a ROM, a RAM, and an interface as the main body, for example. The ECU 50 is input with the detection results detected by the vehicle speed sensor 10, the acceleration sensor 11, the yaw rate sensor 12, the accelerator sensor 13, and the brake sensor 14, the GPS information acquired by the GPS device 15, the read-ahead information acquired by the wireless communication device 16, various information stored in the database 17, a drive signal of each unit, and an electric signal corresponding to the control command, and the like. The ECU 50 controls the HMI device 4, the engine 5, the MG 6, the transmission 7, the brake device 8, the battery 9, and the like according to the input electric signals, and the like. The ECU 50 executes, for example, the drive control of the engine 5, the drive control of the MG 6, the speed change control of the transmission 7, the brake control of the brake device 8, and the like based on the accelerator opening, the vehicle speed, and the like. The ECU 50 can realize various vehicle traveling (traveling mode) in the vehicle 2 by simultaneously using or selectively using the engine 5 and the MG 6 according to the driving state, for example.

For example, the ECU 50 can detect the ON/OFF of the accelerator operation, which is an acceleration request operation on the vehicle 2 by the driver, and the accelerator opening based on the detection result of the accelerator sensor 13. Similarly, the ECU 50 can detect the ON/OFF of the brake operation, which is a brake request operation on the vehicle 2 by the driver, based on the detection result of the brake sensor 14, for example. A state in which the accelerator operation by the driver is turned OFF is a state in which the driver canceled the acceleration request operation on the vehicle 2, and a state in which the accelerator operation by the driver is turned ON is a state in which the driver is carrying out the acceleration request operation on the vehicle 2. Similarly, a state in which the brake operation by the driver is turned OFF is a state in which the driver canceled the brake request operation on the vehicle 2, and a state in which the brake operation by the driver is turned ON is a state in which the driver is carrying out the brake request operation on the vehicle 2. The ECU 50 detects a driver request power based on the accelerator opening.

One example of the schematic configuration of the ECU 50 will be hereinafter described with reference to the block diagram of FIG. 2. As illustrated in FIG. 2, the ECU 50 includes a vehicle characteristic calculating unit 51, a storage unit 52, a drive assisting control unit 53, and a vehicle behavior stability control detecting unit 54. The vehicle characteristic calculating unit 51, the storage unit 52, and the vehicle behavior stability control detecting unit 54 are arranged in the decelerating factor estimating device 1. The decelerating factor estimating device 1 may include various types of sensors for detecting the vehicle state, and various types of information acquiring units for providing information of the periphery in addition to the ECU 50. The decelerating factor estimating device 1 may not include various types of sensors for detecting the vehicle state and various types of information acquiring units for providing information of the periphery, and may include a communication unit for acquiring information from the various types of sensors for detecting the vehicle state and the various types of information acquiring units for providing the information of the periphery as an acquiring unit. The vehicle characteristic calculating unit 51, the drive assisting control unit 53, and the vehicle behavior stability control detecting unit 54 of the ECU 50 are connected to actuator ECUs and sensors for controlling various types of actuators such as an engine control ECU, an MG control ECU, a transmission control ECU, a brake control ECU, a battery control ECU and the like through a CAN (Control Area Network) 56 built as an in-vehicle network. The vehicle characteristic calculating unit 51, the drive assisting control unit 53, and the vehicle behavior stability control detecting unit 54 acquire control values of the various types of actuators and detection values of sensors through the CAN 56 as vehicle information.

The vehicle characteristic calculating unit 51 calculates various types of properties of the vehicle 2, or the decelerating factors of the vehicle 2 in the present embodiment. Specifically, the vehicle characteristic calculating unit 51 acquires various types of information through the CAN 56 and analyzes the acquired information to estimate the decelerating factor of the vehicle 2.

The vehicle characteristic calculating unit 51 includes a vehicle speed calculating unit (vehicle speed acquiring unit) 60, an acceleration calculating unit (acceleration acquiring unit) 61, a drive force calculating unit (drive force acquiring unit) 62, a vehicle weight calculating unit 63, an air resistance calculating unit 64, a road load calculating unit 65, a vehicle weight abnormality determining unit 66, and an estimation process control unit 68. In the decelerating factor estimating device 1, the configuration including the vehicle weight calculating unit 63, the air resistance calculating unit 64, the road load calculating unit 65, the vehicle weight abnormality determining unit 66, and the estimation process control unit 68 of the vehicle characteristic calculating unit 51 becomes a decelerating factor estimating unit. The vehicle speed calculating unit 60, the acceleration calculating unit 61, and the drive force calculating unit 62 acquire various types of parameters to use in the estimation of the decelerating factor.

The vehicle speed calculating unit 60 is a calculating unit for acquiring the vehicle speed of the vehicle 2. The vehicle speed calculating unit 60 can acquire the vehicle speed of the vehicle 2 by acquiring the detection value of the vehicle speed sensor 10 through the CAN 56. The vehicle speed calculating unit 60 may acquire the acquired detection value of the vehicle speed sensor 10 as is as the vehicle speed of the vehicle 2, or may perform computation process on the detection value of the vehicle speed sensor 10 to acquire the vehicle speed of the vehicle 2.

The acceleration calculating unit 61 is a calculating unit for acquiring the acceleration of the vehicle 2. The acceleration calculating unit 61 can acquire the acceleration of the vehicle 2 by acquiring the detection value of the acceleration sensor 11 through the CAN 56. The acceleration calculating unit 61 may acquire the acquired detection value of the acceleration sensor 11 as is as the vehicle speed of the vehicle 2, or may perform the computation process on the detection value of the acceleration sensor 11 to acquire the vehicle speed of the vehicle 2. The acceleration calculating unit 61 may calculate the acceleration without using the detection value of the acceleration sensor 11. For example, the acceleration calculating unit 61 may acquire the acceleration by differentiating the vehicle speed detected by the vehicle speed sensor 10.

The drive force calculating unit 62 is a calculating unit for acquiring the drive force of the vehicle 2. The drive force calculating unit 62 can acquire the drive force of the vehicle 2 by acquiring the detection values of the drive conditions of the engine 5 and the MG 6 through the CAN 56 and computing the detection value. For example, the drive force calculating unit 62 can calculate by computing the rotation number of the engine 5, the output of the MG 6, and the like based on various conditions. Further, the drive force calculating unit 62 may acquire the drive force by acquiring and computing the value of the load (engine brake, regenerating brake) generated in the engine 5 and the MG 6 of when the driver is not carrying out the brake operation at the time of deceleration. The drive force calculating unit 62 may acquire the detection value, that is, the accelerator opening of the accelerator sensor 13 through the CAN 56 and acquire the drive force of the vehicle 2 from the acquired accelerator opening.

The vehicle weight calculating unit 63 is a calculating unit for estimating a weight of the vehicle. The air resistance calculating unit 64 is a calculating unit for estimating an air resistance coefficient. The road load calculating unit 65 is a calculating unit for estimating a road load. The computation executed by the vehicle weight calculating unit 63, the air resistance calculating unit 64, and the road load calculating unit 65 will be described later. The road load (traveling resistance) is the resistance generated from the drive source to the road surface, and includes a road surface resistance generated between the tire and the road surface, a resistance (mechanical loss) generated in the drive system for transmitting the drive force generated by the drive source, and the like. Thus, in the vehicle characteristic calculating unit 51 of the present embodiment, the vehicle weight, the air resistance coefficient, and the road load estimated by the vehicle weight calculating unit 63, the air resistance calculating unit 64, and the road load calculating unit 65 become the decelerating factors.

The vehicle weight abnormality determining unit 66 determines whether the estimated vehicle weight is abnormal. The vehicle weight abnormality determining unit 66 acquires the estimated vehicle weight from the vehicle weight calculating unit 63, and determines that the vehicle weight is abnormal when the estimated vehicle weight is greater than a threshold value. The vehicle weight abnormality determining unit 66 transmits the determination result to the estimation process control unit 68. The vehicle weight abnormality determining unit 66 may be arranged integrally with the estimation process control unit 68.

The estimation process control unit 68 controls the process of each section of the vehicle characteristic calculating unit 51. The estimation process control unit 68 determines whether or not to execute the process of estimating the vehicle weight with the vehicle weight calculating unit 63, whether or not to execute the process of estimating the air resistance coefficient with the air resistance calculating unit 64, and whether or not to execute the process of estimating the road load with the road load calculating unit 65 based on the vehicle speed acquired by the vehicle speed calculating unit 60 and the acceleration acquired by the acceleration calculating unit 61, and executes the estimation process of various decelerating factors based on the determination. The estimation process control unit 68 also determines whether or not to stop the estimation of the air resistance coefficient and the road load based on the determination result determined by the vehicle weight abnormality determining unit 66. The process executed by the estimation process control unit 68 will be described later.

The storage unit 52 stores the value calculated by the vehicle characteristic calculating unit 51 and the value necessary for the various computations. The storage unit 52 stores the estimated value of the decelerating factor calculated at least in the current situation. In the present embodiment, the storage unit 52 is arranged in the ECU 50, but the necessary information may be stored in the database 17.

The drive assisting control unit 53 includes a calculating unit of ITS (Intelligent Transport Systems) correspondence, for example, the calculating unit carrying out infrastructure cooperation and NAVI cooperation. The drive assisting control unit 53 executes a read-ahead information eco drive assisting process that utilizes the so-called read-ahead information. In other words, the vehicle control system 3 utilizes the read-ahead information and has the drive assisting control unit 53 carry out the drive of high fuel economy enhancing effect to assist the economical driving (eco drive). The vehicle control system 3 thus can suppress the consumption of fuel and enhance the fuel economy. The drive assisting control unit 53 outputs the drive assistance information to the HMI device 4 and inductively assists the operation by the driver in an aim of assisting the economical driving by the driver. For the drive assistance, the drive assisting control unit 53 switches ON/OFF of the engine when the traveling is stopped.

The drive assisting control unit 53 acquires the information of the path on which the vehicle 2 travels in the future based on the various types of information acquired through the CAN 56, for example, the position information acquired by the GPS device 15, the traffic light cycle of the traffic light to pass acquired by the wireless communication device 16, and the like. The drive assisting control unit 53 acquires the current traveling state (vehicle speed, remaining amount of the battery, etc.) through the CAN 56. The drive assisting control unit 53 can execute the drive assistance by using the information of the path on which the vehicle 2 travels in the future and the current traveling state, as well as each decelerating factor calculated by the decelerating factor estimating device 1.

The drive assisting control unit 53 controls the engine 5 according to the situation and executes various drive assistances to assist traveling that has high fuel economy enhancement effect and that is comfortable to the driver. Specifically, the drive assisting control unit 53 acquires the information of the stop position such as the traffic light, the intersection, and the like, and determines whether there is a need to stop in the traveling direction. When determined to stop the vehicle 2, the drive assisting control unit 53 specifies the target stop position from the information on the position of the stop line at the traffic light, the intersection, and the like, and controls ON/OFF of the engine 5 based on the traveling speed of the traveling vehicle 2, the distance to the target stop position of the target, and the driver request power input with the operation of the driver.

The drive assisting control unit 53 controls the HMI device 4 according to the situation and outputs various drive assistance information to carry out assistance urging the driving of high fuel economy enhancement effect to the driver. The drive assisting control unit 53 outputs various drive assistance information from the HMI device 4 based on the target traveling state amount of the traveling vehicle 2 to carry out inductive assistance urging recommended driving operation, typically, the driving operation involving change with respect to the driver. The target traveling state amount is typically the target traveling state amount of the vehicle 2 at a predetermined point or a predetermined timing in the traveling vehicle 2. The drive assisting control unit 53 controls the HMI device 4 based on the target traveling state amount at the predetermined point or the predetermined timing, outputs the drive assistance information from the HMI device 4 and carries out assistance urging the recommended driving operation to the driver to carry out the drive assistance so that the traveling state amount of the vehicle 2 becomes the target traveling state amount at the predetermined point and timing.

The drive assisting control unit 53 is not limited to outputting the drive assistance information of induction of the accelerator OFF operation and the brake ON operation by visual information. The decelerating factor estimating device 1 may, for example, output the drive assistance information by sound information, tactile information, and the like, or may be configured to appropriately change the mode of the sound information and the tactile information.

The vehicle behavior stability control detecting unit 54 detects whether the control for stabilizing the behavior of the vehicle, and mainly the control of the brake force is executed. The control for stabilizing the behavior of the vehicle includes ABS (Anti-lock Brake System) control, VCS (Vehicle Control System) control, TRC (Traction Control System) control, and the like. The TRC control is also referred to as TCS (Traction Control System) control and TCL (Traction Control) control. The vehicle behavior stability control detecting unit 54 determines whether various types of controls are executed based on the vehicle information acquired from the CAN 56. The vehicle behavior stability control detecting unit 54 transmits the detection result to the estimation process control unit 68 of the vehicle characteristic calculating unit 51 and the drive assisting control unit 53.

Figure 3:
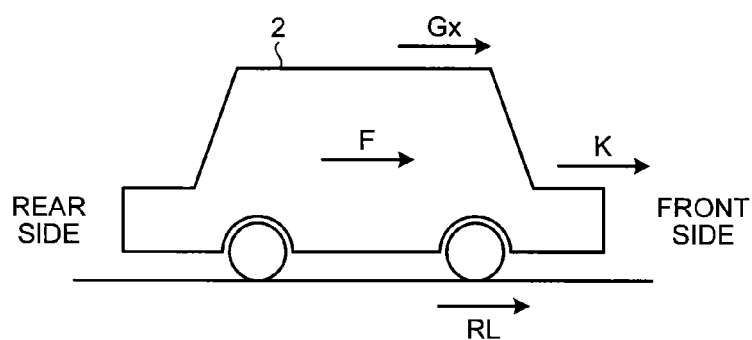
FIG. 3 is an explanatory view schematically illustrating a force acting on the vehicle.

One example of the process of the decelerating factor estimating device 1 will now be described using FIG. 3 to FIG. 15. First, the decelerating factor estimated by the decelerating factor estimating device 1 will be described. FIG. 3 is an explanatory view schematically illustrating the force acting on the vehicle. The force acting on the vehicle 2 at the time of traveling may be applied to a motion equation to obtain the following Expression 1.

$$F = Gx \cdot M + K \cdot Vx^2 + RL \qquad \text{(Expression 1)}$$

Here, F is the drive force, Gx is the acceleration, M is the weight of the vehicle (vehicle weight), K is the air resistance coefficient, Vx is the vehicle speed, and RL is the road load. Each parameter in the Expression has the arrow direction of FIG. 3 in the positive direction when the vehicle 2 is traveling forward at the vehicle speed Vx. When the drive force F is basically generated from the drive source, the vehicle 2 at the time of traveling generates the air resistance and the road load in the direction opposite to the direction of the drive force F of the vehicle 2, that is, to reduce speed. Thus, the values of K and RL basically become negative values. The acceleration becomes smaller as the vehicle weight M becomes heavier.

The decelerating factor estimating device 1 determines four terms of the five terms in Expression 1 to calculate the value of one remaining term. Among the terms of the Expression, the acceleration Gx, the vehicle speed Vx, and the drive force F are terms that can be acquired by acquiring from each detection value of the vehicle or by computing each detection value of the vehicle. Thus, the decelerating factor estimating device 1 determines the values of two decelerating factors among the vehicle weight M, the air resistance coefficient K, and the road load RL to estimate the value of one remaining decelerating factor.

The estimation process control unit 68 of the decelerating factor estimating device 1 of the present embodiment determines the term of the decelerating factor to estimate based on the acceleration Gx and the vehicle speed Vx. That is, if the acceleration Gx and the vehicle speed Vx satisfy a predetermined condition, the estimation process control unit 68 carries out the estimation process of the decelerating factor that satisfies the condition. Therefore, if the acceleration Gx and the vehicle Vx do not satisfy the condition for estimation of the decelerating factor, the estimation process control unit 68 does not carry out the estimation process of the relevant decelerating factors.

Figure 4:
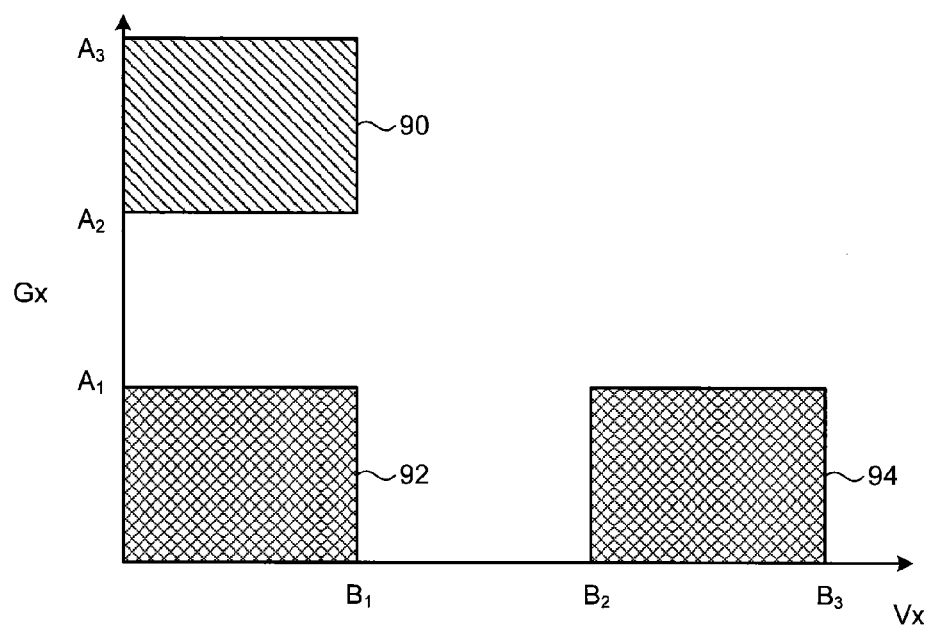
FIG. 4 is an explanatory view illustrating a relationship of a decelerating factor to estimate, a speed, and an acceleration.

FIG. 4 is an explanatory view illustrating a relationship of the decelerating factor to estimate, the speed, and the acceleration. In FIG. 4, the vertical axis indicates the acceleration Gx [m/s$^2$], and the horizontal axis indicates the vehicle speed Vx [km/h]. The accelerations $A_1$, $A_2$, $A_3$ and the speeds $B_1$, $B_2$, $B_3$ are threshold values. The acceleration $A_2$ is 1.0 [m/s$^2$] and the speed $B_2$ is 50.0 [km/h], by way of example. In the present embodiment, the acceleration $A_1$ and the speed $B_1$ respectively become the first threshold value, and the acceleration $A_2$ and the speed $B_2$ respectively become the second threshold value, where first threshold value<second threshold value.

When the acceleration Gx is greater than the acceleration $A_2$ (second threshold value) and smaller than the acceleration $A_3$, and the vehicle speed Vx is smaller than the vehicle speed $B_1$ (first threshold value), that is, when the traveling condition of FIG. 4 is included in a region 90, the estimation process control unit 68 estimates the vehicle weight M1 of the decelerating factors. Here, M1 is the estimated vehicle weight. The vehicle weight M1 is calculated with Expression 2.

$$M1 = \frac{F - K \cdot Vx^2 - RL}{Gx} \quad \text{(Expression 2)}$$

When the acceleration Gx is greater than the acceleration $A_2$ (second threshold value) and smaller than the acceleration $A_3$, and the vehicle speed Vx is smaller than the vehicle speed $B_1$ (first threshold value), the term of $Vx^2$ becomes small with respect to the term of the acceleration Gx, and thus the influence of the term of $Vx^2$ in the above Expression becomes small. Further, since the acceleration Gx is greater than $A_2$, the influence of RL also becomes relatively small. Thus, the estimation process control unit 68 can estimate the vehicle weight M1 while reducing the influence of error of other decelerating factors when the acceleration Gx is greater than the acceleration $A_2$ and smaller than the acceleration $A_3$, and the vehicle speed Vx is smaller than the vehicle speed $B_1$. K and RL are estimated values (previous values) calculated in the current situation read out from the storage unit 52. In the present embodiment, the acceleration $A_3$ is set as the upper limit of the acceleration for executing the estimation, but the upper limit of the acceleration may not be set.

When the acceleration Gx is smaller than the acceleration $A_1$ (first threshold value) and the vehicle speed Vx is greater than the vehicle speed $B_2$ (second threshold value) and smaller than the vehicle speed $B_3$, that is, when the traveling condition of FIG. 4 is included in a region 94, The estimation process control unit 68 then estimates an air resistance coefficient K1 of the decelerating factors. Here, K1 is an estimated air resistance coefficient. The air resistance coefficient K1 is calculated with the following Expression 3.

$$K1 = \frac{F - Gx \cdot M - RL}{Vx^2} \quad \text{(Expression 3)}$$

When the acceleration Gx is smaller than the acceleration $A_1$ and the vehicle speed Vx is greater than the vehicle speed $B_2$ and smaller than the vehicle speed $B_3$, the influence of the term of Gx in the above Expression becomes small with respect to the term of $Vx^2$. Further, since the vehicle speed Vx is greater than the vehicle speed $B_2$, the influence of RL becomes relatively small. Thus, the estimation process control unit 68 can estimate the air resistance coefficient K1 while reducing the influence of error of other decelerating factors when the acceleration Gx is smaller than the acceleration $A_1$ and the vehicle speed Vx is greater than the vehicle speed $B_2$ and smaller than the vehicle speed $B_3$. M and RL are estimated values (previous values) calculated in the current situation read out from the storage unit 52. In the present embodiment, the speed $B_3$ is set as the upper limit of the speed for executing the estimation, but the upper limit of the speed may not be set.

When the acceleration Gx is smaller than the acceleration $A_1$ (first threshold value) and the vehicle speed Vx is smaller than the speed $B_1$ (first threshold value), that is, when the traveling condition of FIG. 4 is included in a region 92, the estimation process control unit 68 estimates a road load RL1 of the decelerating factors. Here, RL1 is the estimated road load. The road load RL1 is calculated with the following Expression 4.

$$RL1 = F - Gx \cdot M - K \cdot Vx^2 \quad \text{(Expression 4)}$$

When the acceleration Gx is smaller than the acceleration $A_1$ and the vehicle speed Vx is smaller than the speed $B_1$, the influence of both the term of $Vx^2$ and the term of Gx on F becomes small. Thus, the estimation process control unit 68 can estimate the road load RL1 while reducing the influence of error of other decelerating factors when the acceleration Gx is smaller than the acceleration $A_1$ and the vehicle speed Vx is smaller than the speed $B_1$. M and K are estimated values (previous values) calculated in the current situation read out from the storage unit 52.

Figure 5:
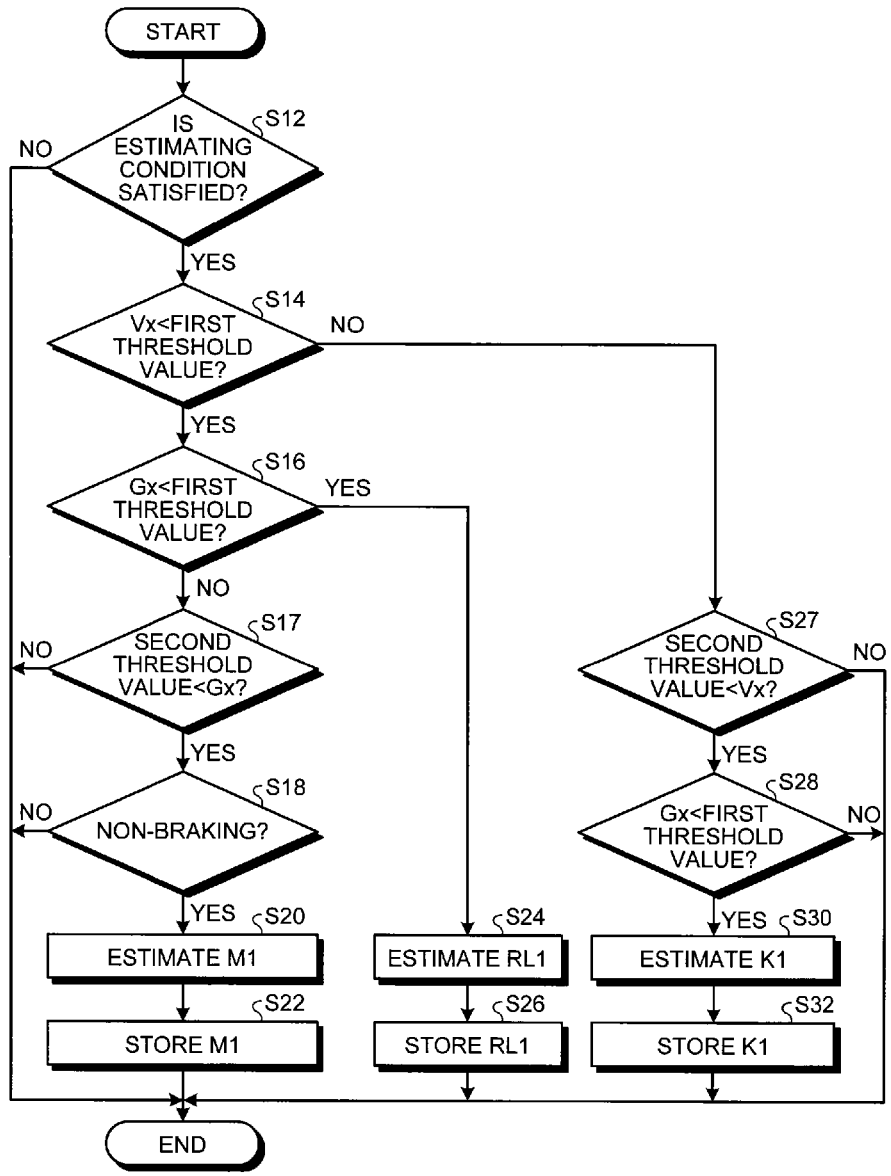
FIG. 5 is a flowchart illustrating one example of a control by the ECU.

One example of a process procedure by the estimation process control unit 68 will now be described using FIG. 5. FIG. 5 is a flowchart illustrating one example of a control by the ECU 50. The estimation process control unit 68 performs various process determinations based on the value calculated in each section of the vehicle characteristic calculating unit 51 and the state of the vehicle 2 acquired from the CAN 56, and controls the operation of each section of the vehicle characteristic calculating unit 51 to execute the process illustrated in FIG. 5.

The estimation process control unit 68 determines whether the estimating condition is satisfied in step S12. The estimating condition is determined based on the shift position, the vehicle speed, and the yaw rate. The shift position can be acquired by detecting the state of the transmission 7 through the CAN 56. The estimation process control unit 68 determines that the estimating condition is satisfied when all the conditions in which the shift position is in drive, the vehicle speed Vx is greater than zero (0<Vx) and the yaw rate YR is smaller than the threshold value (YR<threshold value) are satisfied. That is, the estimation process control unit 68 determines that the estimating condition is satisfied when the vehicle 2 is moving and is not bent by greater than or equal to the threshold value with the drive force of the drive source being transmitted. The estimation process control unit 68 terminates the present process when determined that the estimating condition is not satisfied (No) in step S12.

When determined that the estimating condition is satisfied (Yes) in step S12, the estimation process control unit 68 determines whether vehicle speed Vx<first threshold value, that is, whether the vehicle speed Vx is smaller than the first threshold value (e.g., speed $B_1$) in step S14. The estimation process control unit 68 proceeds to step S16 when determined as Vx<first threshold value (Yes) in step S14, and proceeds to step S27 when determined as not Vx<first threshold value (No), that is, when Vx≥first threshold value.

When determined as Yes in step S14, the estimation process control unit 68 determines whether acceleration Gx<first threshold value, that is, whether the acceleration Gx is smaller than the first threshold value (e.g., acceleration $A_1$) in step S16. The estimation process control unit 68 proceeds to step S17 when determined as not acceleration Gx<first threshold value (No) in step S16, that is, when determined as acceleration Gx≥first threshold value, and proceeds to step S24 when determined as acceleration Gx<first threshold value (Yes).

When determined as No in step S16, the estimation process control unit 68 determines whether second threshold value<acceleration Gx, that is, whether the acceleration Gx is greater than the second threshold value (e.g., acceleration $A_2$) in step S17. The estimation process control unit 68 terminates the present process when determined as not second threshold value<acceleration Gx (No), that is, when acceleration Gx≤second threshold value in step S17. That is, when the vehicle speed Vx is smaller than the first threshold value and the acceleration Gx is greater than or equal to the first threshold value and smaller than or equal to the second threshold value, for example, when the traveling condition is between the region 90 and the region 92 in FIG. 4, the estimation process control unit 68 terminates the present process without performing the estimation. The estimation process control unit 68 proceeds to step S18 when determined as second threshold value<acceleration Gx (Yes). The estimation process control unit 68 determines whether acceleration Gx<third threshold value (e.g., acceleration $A_3$) when determined as Yes in step S17, and may proceed to step S18 only when determined as acceleration Gx<third threshold value.

The estimation process control unit 68 determines as non-braking in step S18 when determined as Yes in step S17. That is, whether or not the brake operation is detected by the brake sensor 14 is determined. The estimation process control unit 68 terminates the present process when determined as not non-braking (No) in step S18, that is, when determined that the brake operation is detected by the brake sensor 14. The estimation process control unit 68 terminates the present process without performing the estimation when the brake operation is being executed. When determined as non-braking (Yes) in step S18, that is, when determined that the brake operation is not detected by the brake sensor 14, the estimation process control unit 68 performs the estimation of the vehicle weight M1 in step S20. The estimation of the vehicle weight M1 is executed using the above Expression in the vehicle weight calculating unit 63. After estimating the vehicle weight M1 in step S20, the estimation process control unit 68 stores the estimated vehicle weight M1 in the storage unit 52 in step S22, and terminates the present process.

When determined as Yes in step S16, the estimation process control unit 68 performs the estimation of the road load RL1 in step S24. The estimation of the road load RL1 is executed using the above Expression in the road load calculating unit 65. After estimating the road load RL1 in step S24, the estimation process control unit 68 stores the road load RL1 in the storage unit 52 in step S26 and terminates the present process.

When determined as No in step S14, the estimation process control unit 68 estimates whether second threshold value<vehicle speed Vx, that is, whether the vehicle speed Vx is greater than the second threshold value (e.g., speed $B_2$) in step S27. The estimation process control unit 68 terminates the present process when determined as not second threshold value<vehicle speed Vx (No), that is, when determined as vehicle speed Vx≤second threshold value in step S27. That is, when the vehicle speed Vx is greater than or equal to the first threshold value and smaller than or equal to the second threshold value, for example, when the traveling condition is between the region 92 and the region 94 in FIG. 4, the estimation process control unit 68 terminates the present process without performing the estimation. The estimation process control unit 68 proceeds to step S28 when determined as second threshold value<vehicle speed Vx (Yes). The estimation process control unit 68 determines whether vehicle speed Vx<third threshold value (e.g., speed $B_3$) when determined as Yes in step S27, and may proceed to step S28 only when vehicle speed Vx<third threshold value.

When determined as Yes in step S27, the estimation process control unit 68 determines whether acceleration Gx<first threshold value, that is, whether the acceleration Gx is smaller than the first threshold value (e.g., acceleration $A_1$) in step S28. The estimation process control unit 68 terminates the present process when determined as not acceleration Gx<first threshold value (No), that is, when determined that the acceleration Gx≥first threshold value in step S28.

When determined as acceleration Gx<first threshold value (Yes) in step S28, the estimation process control unit 68 performs the estimation of the air resistance coefficient K1 in step S30. The estimation of the air resistance coefficient K1 is executed using the above Expression in the air resistance calculating unit 64. After estimating the air resistance coefficient K1 in step S30, the estimation process control unit 68 stores the air resistance coefficient K1 in the storage unit 52 in step S32, and terminates the present process.

The estimation process control unit 68 estimates the vehicle weight M1 when the acceleration Gx and the vehicle speed Vx are within a predetermined range and at the time of non-braking in the flowchart illustrated in FIG. 5. That is, the estimation process control unit 68 sets the traveling condition for estimating the vehicle weight M1 as being in non-braking in addition to the range of the acceleration Gx and the vehicle speed Vx. The estimation process control unit 68 may assume the traveling condition for estimating the road load RL1 as being in non-braking in addition to the range of the acceleration Gx and the vehicle speed Vx. That is, the estimation process control unit 68 may estimate the road load RL1 when the acceleration Gx and the vehicle speed Vx are within a predetermined range and at the time of non-braking.

The estimation process control unit 68 of the decelerating factor estimating device 1 then changes the values of the first threshold values of the acceleration and the speed depending on whether or not the estimated value of the vehicle weight is converging and whether or not the estimated value of the air resistance coefficient is converging. The setting process of the first threshold values of the acceleration and the speed will be described below.

Figure 6:
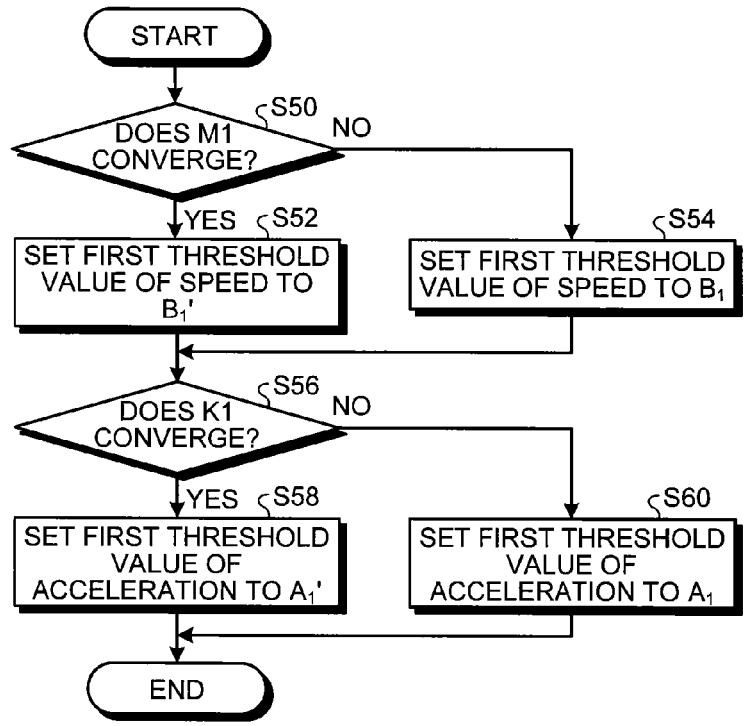
FIG. 6 is a flowchart illustrating one example of the control by the ECU.

FIG. 6 is a flowchart illustrating one example of the control by the ECU. The setting process of the first threshold values of the acceleration and the speed will be described below using FIG. 6. The estimation process control unit 68 determines whether the M1 is converging, that is, whether the vehicle weight M1, which is the estimated value, is converging in step S50. For example, the estimation process control unit 68 determines that the vehicle weight M1 is converging when the change amount per unit time of the vehicle weight M1, which is the estimated value, is smaller than or equal to the threshold value, and determines that the vehicle weight M1 is not converging when the change amount per unit time of the vehicle weight M1, which is the estimated value, is greater than the threshold value. The determination criteria for the convergence of the vehicle weight M1 is not limited thereto, and various criteria to use for the determination of convergence of the calculated value can be used.

When determined that the vehicle weight M1 is converging (Yes) in step S50, the estimation process control unit 68 sets the first threshold value of the speed to speed $B_1'$ in step S52, and proceeds to step S56. When determined that the vehicle weight M1 is not converging (No) in step S50, the estimation process control unit 68 sets the first threshold value of the speed to the speed $B_1$ in step S54, and proceeds to step S56. Here, the speed $B_1'$ is a speed higher than the speed $B_1$. That is, when determined that the vehicle weight M1 is converging, the estimation process control unit 68 sets the first threshold value of the speed to be a higher speed than when the vehicle weight M1 is not converging.

After determining the first threshold value of the speed in step S52 or step S54, the estimation process control unit 68 determines whether K1 is converging, that is, whether the air resistance coefficient K1, which is the estimated value, is converging in step S56. For example, the estimation process control unit 68 determines that the air resistance coefficient K1 is converging when the change amount per unit time of the air resistance coefficient K1, which is the estimated value, is smaller than or equal to the threshold value, and determines that the air resistance coefficient K1 is not converging when the change amount per unit time of the air resistance coefficient K1, which is the estimated value, is greater than the threshold value. The determination criteria for the convergence of the air resistance coefficient K1 is not limited thereto, and various criteria to use for the determination of convergence of the calculated value can be used.

When determined that the air resistance coefficient K1 is converging (Yes) in step S56, the estimation process control unit 68 sets the first threshold value of the acceleration to acceleration $A_1'$ in step S58, and terminates the present process. When determined that the air resistance coefficient K1 is not converging (No) in step S56, the estimation process control unit 68 sets the first threshold value of the acceleration to the speed $A_1$ in step S60, and terminates the present process. Here, the acceleration $A_1'$ is an acceleration higher than the acceleration $A_1$. That is, when determined that the air resistance coefficient K1 is converging, the estimation process control unit 68 sets the first threshold value of the acceleration to be a higher acceleration than when the air resistance coefficient K1 is not converging.

Figure 7:
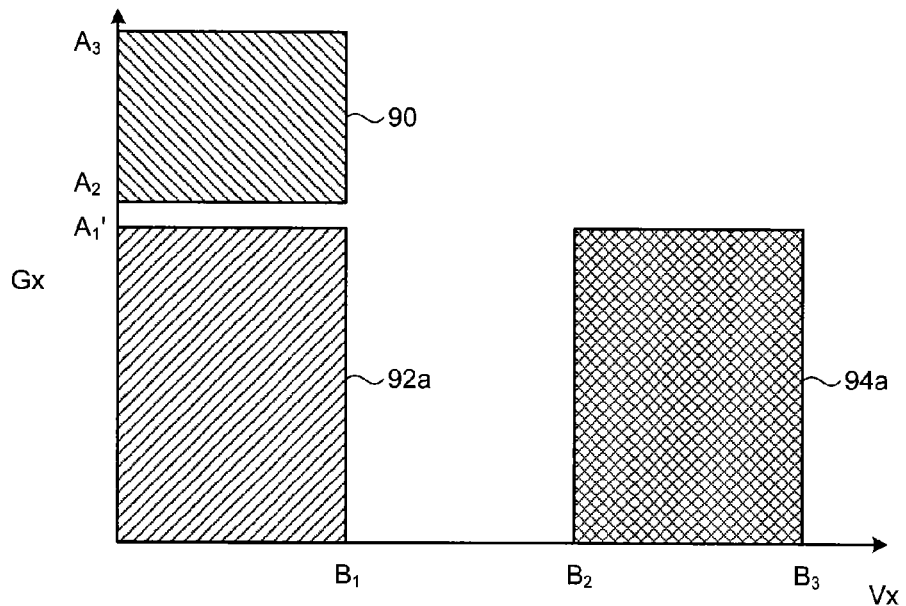
FIG. 7 is an explanatory view illustrating other relationships of the decelerating factor to estimate, the speed, and the acceleration.
Figure 8:
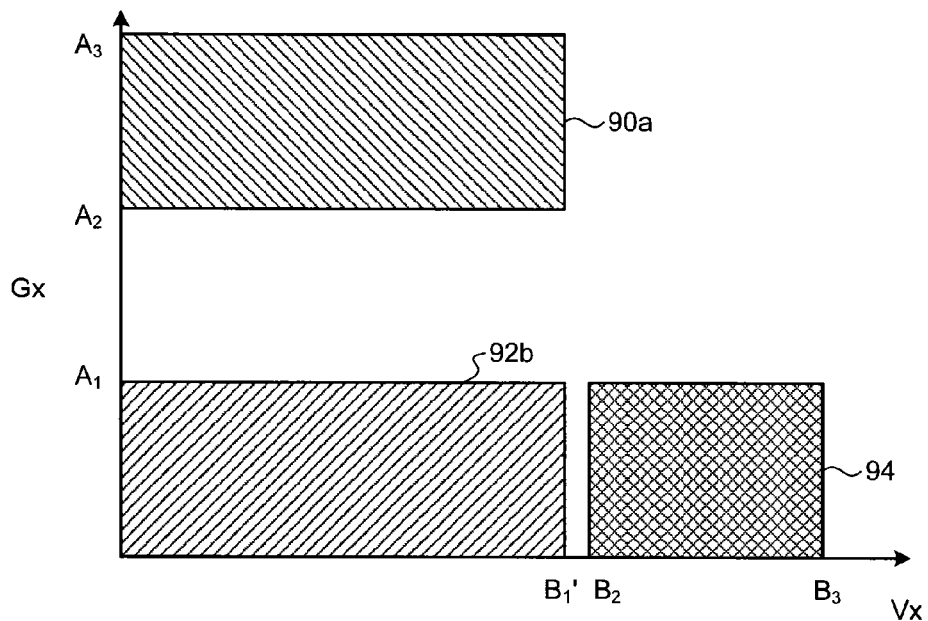
FIG. 8 is an explanatory view illustrating other relationships of the decelerating factor to estimate, the speed, and the acceleration.
Figure 9:
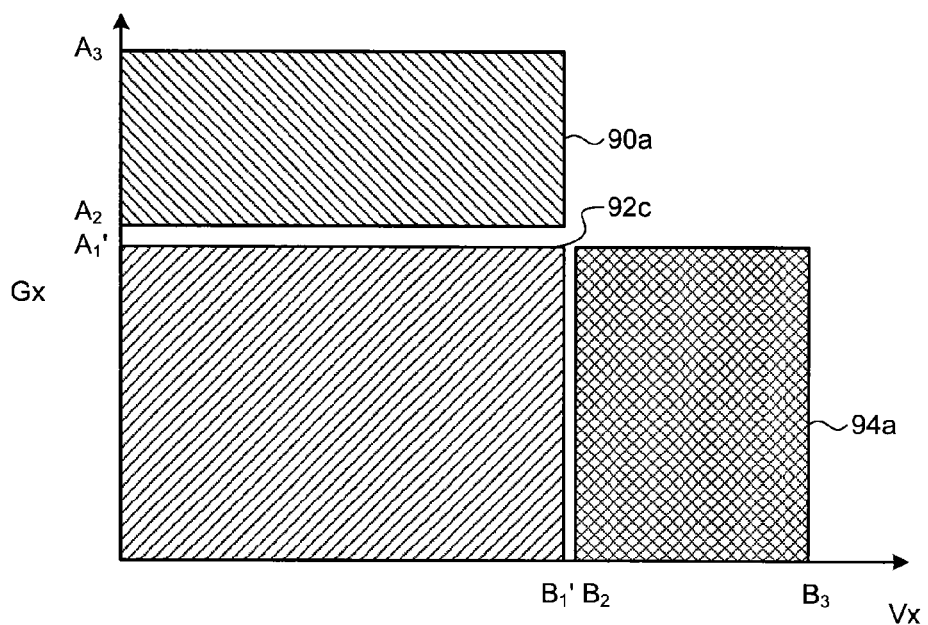
FIG. 9 is an explanatory view illustrating other relationships of the decelerating factor to estimate, the speed, and the acceleration.

FIG. 7 to FIG. 9 are explanatory views each illustrating other relationships of the decelerating factor to estimate, the speed, and the acceleration. The estimation process control unit 68 can change the range of the traveling condition for estimating each decelerating factor depending on whether the decelerating factor is converging by setting the first threshold value of the acceleration and the first threshold value of the speed in the process of FIG. 6.

When the vehicle weight M1 is not converging (non-converging) and the air resistance coefficient K1 is not converging (non-converging), the estimation process control unit 68 sets the first threshold value of the acceleration to the acceleration $A_1$, and the first threshold value of the speed as the speed $B_1$. In this case, the estimation process control unit 68 estimates the vehicle weight M1 with the traveling condition of the region 90, estimates the road load RL1 with the traveling condition of the region 92, and estimates the air resistance coefficient K1 with the traveling condition of the region 94, as illustrated in FIG. 4 described above.

When the vehicle weight M1 is converging and the air resistance coefficient K1 is not converging (non-converging), the estimation process control unit 68 sets the first threshold value of the acceleration to the acceleration $A_1'$ and the first threshold value of the speed as the speed $B_1$. In this case, the estimation process control unit 68 estimates the vehicle weight M1 with the traveling condition of the region 90, estimates the road load RL1 with the traveling condition of a region 92a, and estimates the air resistance coefficient K1 with the traveling condition of a region 94a, as illustrated in FIG. 7. The acceleration $A_1'$ is an acceleration higher than the acceleration $A_1$, and is an acceleration lower than the acceleration $A_2$. Thus, in the regions 92a, 94a, the acceleration is such that the upper limit of the acceleration of the traveling condition is higher than in the regions 92, 94. Thus, when the vehicle weight M1 is converging, the estimation process control unit 68 executes the estimation of the road load RL1 and the air resistance coefficient K1 even at higher acceleration than when the vehicle weight M1 is not converging. When the vehicle weight M1 is converging, the error of the vehicle weight M1 becomes small. Thus, even when executing the estimation of the road load RL1 and the air resistance coefficient K1 at high acceleration, the decelerating factor estimating device 1 can estimate the road load RL1 and the air resistance coefficient K1 while maintaining high accuracy.

When the vehicle weight M1 is not converging (non-converging) and the air resistance coefficient K1 is converging, the estimation process control unit 68 sets the first threshold value of the acceleration to the acceleration $A_1$, and the first threshold value of the speed as the speed $B_1'$. In this case, the estimation process control unit 68 estimates the vehicle weight M1 with the traveling condition of the region 90a, estimates the road load RL1 with the traveling condition of the region 92b, and estimates the air resistance coefficient K1 with the traveling condition of the region 94, as illustrated in FIG. 8. The speed $B_1'$ is a speed higher than the speed $B_1$, and a speed lower than the speed $B_2$. Thus, in the regions 90a, 92b, the upper limit of the speed of the traveling condition is the speed higher than in the regions 90, 92. Thus, when the air resistance coefficient K1 is converging, the estimation process control unit 68 executes the estimation of the vehicle weight M1 and the road load RL1 even at higher speed than when the air resistance coefficient K1 is not converging. When the air resistance coefficient K1 is converging, the error of the air resistance coefficient K1 becomes small. Thus, even when executing the estimation of the vehicle weight M1 and the road load RL1 at high speed, the decelerating factor estimating device 1 can estimate the vehicle weight M1 and the road load RL1 while maintaining high accuracy.

When the vehicle weight M1 is converging and the air resistance coefficient K1 is converging, the estimation process control unit 68 sets the first threshold value of the acceleration to the acceleration $A_1'$, and the first threshold value of the speed as the speed $B_1'$. In this case, the estimation process control unit 68 estimates the vehicle weight M1 with the traveling condition of the region 90a, estimates the road load RL1 with the traveling condition of the region 92c, and estimates the air resistance coefficient K1 with the traveling condition of the region 94a, as illustrated in FIG. 9. The region 90a is the region same as the region 90a of FIG. 8. The region 94a is the region same as the region 94a of FIG. 7. In the region 92c, the upper limit of the acceleration is the acceleration higher than in the region 92, and the upper limit of the speed is the speed higher than in the region 92. When the vehicle weight M1 is converging and the air resistance coefficient K1 is converging, the estimation process control unit 68 executes the estimation of the road load RL1 and the air resistance coefficient K1 even at higher acceleration than when the vehicle weight M1 is not converging. When the vehicle weight M1 is converging and the air resistance coefficient K1 is converging, the estimation process control unit 68 executes the estimation of the vehicle weight M1 and the road load RL1 even at higher speed than when the air resistance coefficient K1 is not converging. Therefore, when the vehicle weight M1 is converging and the air resistance coefficient K1 is converging, the estimation process control unit 68 can estimate the road load RL1 with the traveling condition wider than in any of the cases of FIG. 4, FIG. 7, and FIG. 8. When the vehicle weight M1 is converging and the air resistance coefficient K1 is converging, the error of the vehicle weight M1 and the air resistance coefficient K1 becomes small. Thus, even when executing the estimation of the road load RL1 at high acceleration and high speed, the decelerating factor estimating device 1 can estimate the road load RL1 while maintaining high accuracy.

The decelerating factor estimating device 1 changes the traveling condition for performing the estimation of the second decelerating factor (the air resistance coefficient K1 and the road load RL1 in the case of the vehicle weight M1, and the vehicle weight M1 and the road load RL1 in the case of the air resistance coefficient K1) depending on whether or not the first decelerating factor (e.g., vehicle weight M1, air resistance coefficient K1) is converging. Specifically, when the first decelerating factor is converging, the decelerating factor estimating device 1 executes the estimation with the traveling condition (enlarged traveling condition) wider than when the first decelerating factor is not converging. Thus, the decelerating factor estimating device 1 can increase the opportunity of executing the estimation process of the second decelerating factor after the first decelerating factor is converged, and can converge the second decelerating factor in a shorter period of time. That is, the decelerating factor estimating device 1 can specify the value of the decelerating factor of the vehicle in a shorter period of time. When the first decelerating factor is converged, the decelerating factor estimating device 1 increases the opportunity of executing the estimation process of the second decelerating factor to execute the estimation process of the second decelerating factor with lesser error caused by the first decelerating factor. The decelerating factor estimating device 1 thus can reduce the error at the time of estimation while increasing the opportunity of executing the estimation process of the second decelerating factor. The decelerating factor estimating device 1 thus can estimate the second decelerating factor in a short period of time and at high accuracy.

When the first decelerating factor is the vehicle weight M1, as in the present embodiment, the decelerating factor estimating device 1 changes the first threshold value of the speed as the traveling condition for performing the estimation with the second decelerating factor as the air resistance coefficient K1 and the road load RL1. When the first decelerating factor is the air resistance coefficient K1, as in the present embodiment, the decelerating factor estimating device 1 changes the first threshold value of the acceleration as the traveling condition for performing the estimation with the second decelerating factor as the vehicle weight M1 and the road load RL1. Thus, even if the first threshold value is changed, the occurrence of error can be suppressed, so that the second decelerating factor can be estimated in a short period of time and at high accuracy.

The decelerating factor estimating device 1 may execute only one of the combination of steps S50, S52, S54, or the combination of steps S56, S58, S60 in the flowchart illustrated in FIG. 6.

When the first decelerating factor is the vehicle weight M1, the decelerating factor estimating device 1 of the embodiment described above assumed the air resistance coefficient K1 and the road load L1 as the second decelerating factors, but only one of which may be assumed as the second decelerating factor. When the first decelerating factor is the air resistance coefficient K1, the decelerating factor estimating device 1 of the embodiment described above assumed the vehicle weight M1 and the road load RL1 as the second decelerating factors, but one of which may be assumed as the second decelerating factor.

The decelerating factor estimating device 1 determines the decelerating factor to estimate based on the vehicle speed Vx and the acceleration Gx. That is, the decelerating factor estimating device 1 executes the estimation of the decelerating factor included in the range set by the traveling condition among the decelerating factors to be estimated. Thus, each of the vehicle weight M1, the air resistance coefficient K1, and the road load RL1 to be estimated can be calculated in a state in which the influence of other decelerating factors is small, and each decelerating factor can be calculated at higher accuracy. Even if the other decelerating factors contain an error, the decelerating factor estimating device 1 can reduce the influence thereof when estimating the vehicle weight M1, the air resistance coefficient K1, and the road load RL1 to be estimated. Thus, the possibility of containing error due to the influence of other decelerating factors at the time of the estimation of the decelerating factor can be reduced.

The decelerating factor estimating device 1 can suppress the calculated value from being included in the estimated values of the vehicle weight M1, the air resistance coefficient K1, and the road load RL1 in a state in which the influence of other decelerating factor is large by switching the decelerating factor to estimate based on the vehicle speed Vx and the acceleration Gx. Thus, the possibility of containing error due to the influence of other decelerating factors at the time of the estimation of the deceleration actor can be reduced, and the accuracy in the estimation of the decelerating factor can be enhanced.

The estimation process control unit 68 of the decelerating factor estimating device 1 can stop the estimation of all parameters, that is, prohibit the estimation process of the decelerating factor when the vehicle behavior stability control is actuated. The estimation process control unit 68 of the decelerating factor estimating device 1 preferably stops the estimation of the air resistance coefficient K1 and the road load RL1 when determined that the estimated vehicle weight M1 is abnormal.

Figure 10:
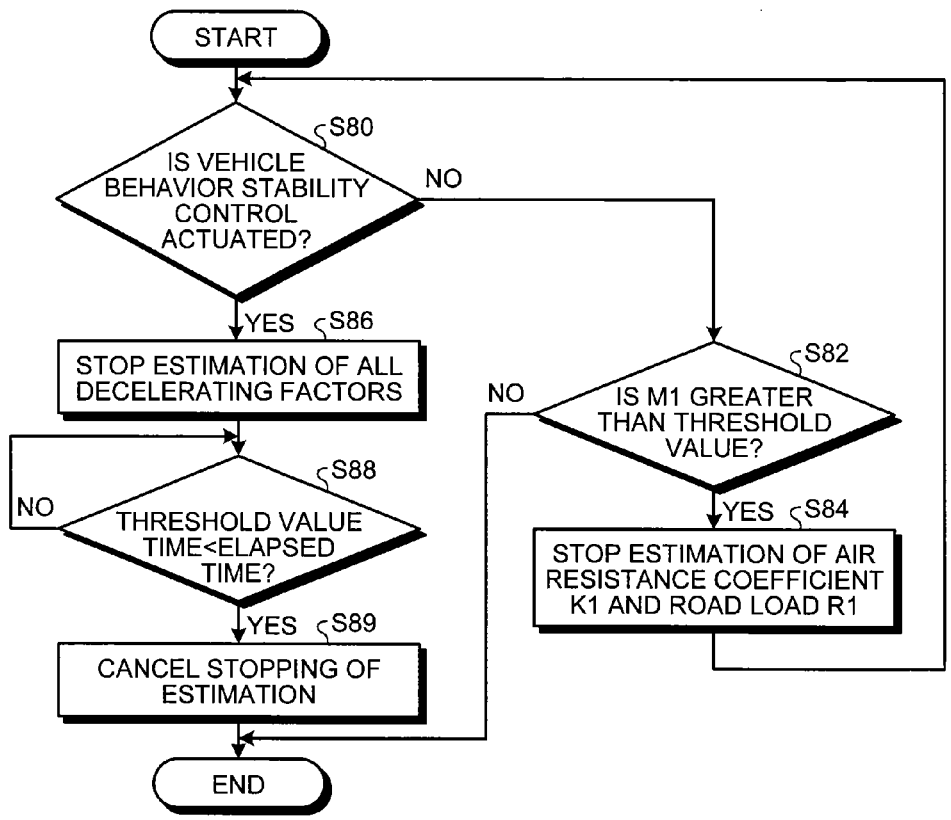
FIG. 10 is a flowchart illustrating one example of the control by the ECU.

FIG. 10 is a flowchart illustrating one example of the control by the ECU. The process of when the vehicle behavior stability control is actuated and when the estimated vehicle weight M1is determined as abnormal will now be described using FIG. 10.

The estimation process control unit 68 determines whether the vehicle behavior stability control is actuated in step S80. The estimation process control unit 68 can detect whether the vehicle behavior stability control (VCS, ABS, TRC, etc.) is actuated by acquiring the detection result of the vehicle behavior stability control detecting unit 54. The estimation process control unit 68 proceeds to step S86 when determined that the vehicle behavior stability control is actuated (Yes) in step S80, and proceeds to step S82 when determined that the vehicle behavior stability control is not actuated (No), that is, when determined that the vehicle behavior stability control is not executed in step S80.

When determined as No in step S80, the estimation process control unit 68 determines whether the M1 is greater than the threshold value in step S82. In the present embodiment, the determination on whether the estimated vehicle weight M1is abnormal is made by whether M1 is greater than the threshold value. The determination on whether the estimated vehicle weight M1 is abnormal is executed by the vehicle weight abnormality determining unit 66. When determined that M1 is greater than the threshold value (Yes) in step S82, the estimation process control unit 68 stops the estimation of the air resistance coefficient K1 and the road load RL1 in step S84. After executing the process of step S84, the estimation process control unit 68 proceeds to step S80. Thus, the estimation process control unit 68 does not execute the vehicle behavior stability control, and stops the estimation of the air resistance coefficient K1 and the road load RL1 when and M1 is greater than the threshold value. That is, the estimation process control unit 68 does not carry out the estimation of the decelerating factor even if the traveling condition for estimating the air resistance coefficient K1 and the road load RL1 is met. The estimation process control unit 68 terminates the present process when determined that M1 is not greater than the threshold value (No) in step S82.

When determined as Yes in step S80, the estimation process control unit 68 stops the estimation of all the decelerating factors in step S86. That is, the estimation process control unit 68 prohibits the estimation process of all the decelerating factors to be estimated. In other words, the estimation process control unit 68 does not carry out the estimation of the decelerating factor even if the traveling condition for estimating the decelerating factor is met.

After stopping the estimation of all the decelerating factors in step S86, the estimation process control unit 68 determines whether threshold value time<elapsed time in step S88. The elapsed time is a time elapsed from when the process of step S86 is executed. The threshold value time is a set time, and is one hour, for example. When determined as not threshold value time<elapsed time (No) in step S88, the estimation process control unit 68 again executes step S88. When determined as threshold value time<elapsed time (Yes) in step S88, the estimation process control unit 68 cancels the stopping of the estimation, that is, permits the estimation process of all the decelerating factors in step S89, and terminates the present process.

As illustrated in FIG. 10, when the vehicle behavior stability control is actuated, the decelerating factor estimating device 1 stops the estimation of the decelerating factor to suppress the estimation process of the decelerating factor from being executed in a state in which the vehicle behavior stability control is actuated and the accuracy in the estimation of the decelerating factor is low. Thus, the decelerating factor estimating device 1 can estimate the decelerating factor at high accuracy.

As illustrated in FIG. 10, when determined that the vehicle behavior stability control is actuated, the decelerating factor estimating device 1 maintains the stopping of the estimation of all the decelerating factors until elapse of the threshold value time. Thus, the stopping of the estimation of all the decelerating factors can be maintained while there is a possibility that the unstable vehicle behavior may continue after the vehicle behavior stability control is detected. The decelerating factor estimating device 1 thus can estimate the decelerating factor at high accuracy.

The decelerating factor estimating device 1 maintained the stopping of the estimation of all the decelerating factors until the elapse of the threshold value time when determined that the vehicle behavior stability control is actuated, but the determination criteria may be distance instead of time.

As illustrated in FIG. 10, when determined that the vehicle weight M1, which is the estimated value, is abnormal, the decelerating factor estimating device 1 stops the estimation of the air resistance coefficient K1 and the road load RL1 to enhance the accuracy in the estimation of the air resistance coefficient K1 and the road load RL1. Specifically, the decelerating factor estimating device 1 can suppress the air resistance coefficient K1 and the road load RL1 from being estimated in a towing state or a state in which load is mounted in excess and the tire is squashed and the road load RL is excessively large, or in a state in which the state in which the air resistance coefficient is large is wrongly detected by determining that the vehicle weight M1, which is the estimated value, is abnormal. The decelerating factor estimating device 1 thus can estimate the decelerating factor at high accuracy.

As illustrated in FIG. 10, the decelerating factor estimating device 1 can estimate the decelerating factor at high accuracy by executing both the process of when the vehicle behavior stability control is actuated and the process of when determined that the estimated vehicle weight M1 is abnormal, but this is not the sole case. The decelerating factor estimating device 1 may execute only one of the process of when the vehicle behavior stability control is actuated and the process of when determined that the vehicle weight M1 is abnormal.

When the estimation of the decelerating factor is executed, the decelerating factor estimating device 1 preferably calculates a corrected estimated value in view of the calculated estimated value and the past estimated value. The decelerating factor estimating device 1 preferably uses the corrected estimated value as a value of the decelerating factor of when using in other devices such as the drive assisting control unit 53, and the like. For example, the vehicle weight M1 preferably calculates the corrected estimated value using the following Expression 5.

$$M1\_F = (1-kk) \cdot M1_{n-1} + kk \cdot M1 \quad \text{(Expression 5)}$$

M1_F is the corrected estimated value, $M1_{n-1}$ is the previous estimated value, and $M1_n$ is the current estimated value. Further, kk is a weighting coefficient. When calculating the corrected estimated value M1_F of the vehicle weight M1, a filter time constant is preferably a filter of short period. By way of example, the filter time constant in which the period is 60 s is preferably used.

Figure 11:
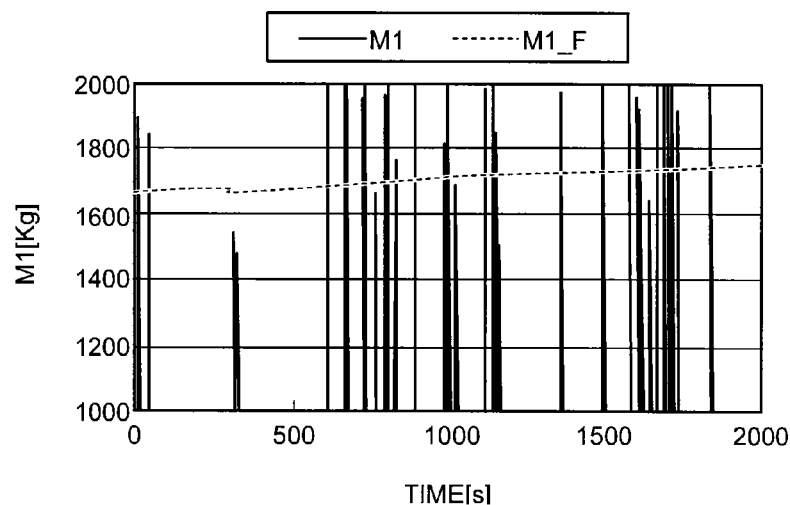
FIG. 11 is an explanatory view illustrating a relationship of the calculation result of the vehicle weight and the time.

FIG. 11 illustrates a relationship of the calculated M1 and M1_F. In FIG. 11, the vertical axis indicates the vehicle weight, and the horizontal axis indicates the time. FIG. 11 is an explanatory view illustrating the relationship of the calculation result of the vehicle weight and the time. The example illustrated in FIG. 11 is an example of when M1 is 1800 kg. As illustrated in FIG. 11, the decelerating factor estimating device 1 calculates the corrected estimated value M1_F in which the current estimated value is corrected using the previous estimated value to calculate the estimated value of higher accuracy.

The air resistance coefficient K1 preferably calculates the corrected estimated value K1_F using the following Expression 6.

$$K1\_F = (1-kk) \cdot K1_{n-1} + kk \cdot K1_n \quad \text{(Expression 6)}$$

K1_F is the corrected estimated value, $K1_{n-1}$ is the previous estimated value, and $K1_n$ is the current estimated value. Further, kk is a weighting coefficient. When calculating the corrected estimated value K1_F of the air resistance coefficient K1, a filter time constant is preferably a filter of long period. By way of example, the filter time constant in which the period is 600 s is preferably used.

Figure 12:
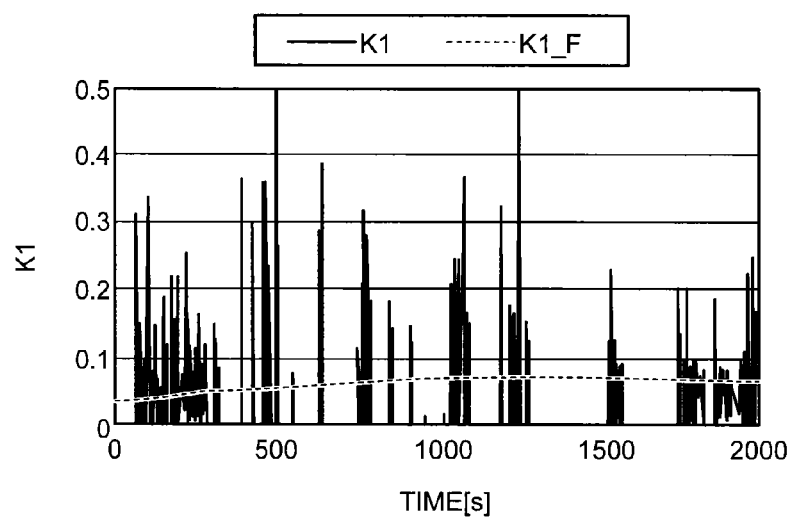
FIG. 12 is an explanatory view illustrating a relationship of the calculation result of the air resistance coefficient and the time.

FIG. 12 illustrates a relationship of the calculated K1 and K1_F. In FIG. 12, the vertical axis indicates the air resistance coefficient, and the horizontal axis indicates the time. FIG. 12 is an explanatory view illustrating the relationship of the calculation result of the air resistance coefficient and the time. As illustrated in FIG. 12, the decelerating factor estimating device 1 calculates the corrected estimated value K1_F in which the current estimated value is corrected using the previous estimated value to calculate the estimated value of higher accuracy.

The road load RL1 preferably calculates the corrected estimated value RL1_F using the following Expression 7.

$$RL1\_F = (1-kk) \cdot RL1_{n-1} + kk \cdot RL1_n \quad \text{(Expression 7)}$$

RL1_F is the corrected estimated value, $RL1_{n-1}$ is the previous estimated value, and $RL1_n$ is the current estimated value. Further, kk is a weighting coefficient. When calculating the corrected estimated value RL1_F of the road load RL1, a filter time constant is preferably a filter of intermediate period. By way of example, the filter time constant in which the period is 300 s is preferably used.

Figure 13:
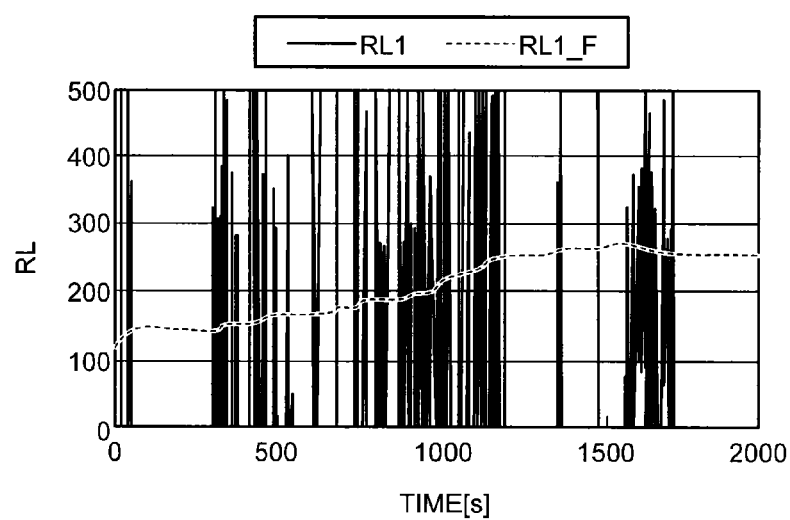
FIG. 13 is an explanatory view illustrating the relationship of the calculation result of the road load and the time.

FIG. 13 illustrates a relationship of the calculated RL1 and RL1_F. In FIG. 13, the vertical axis indicates the road load, and the horizontal axis indicates the time. FIG. 13 is an explanatory view illustrating the relationship of the calculation result of the road load and the time. As illustrated in FIG. 13, the decelerating factor estimating device 1 calculates the corrected estimated value RL1_F in which the current estimated value is corrected using the previous estimated value to calculate the estimated value of higher accuracy.

As illustrated in FIG. 11 to FIG. 13 and Expression 5 to Expression 7, the decelerating factor estimating device 1 can calculate the estimated value of higher accuracy by correcting the estimated value. Further, when calculating the correction value, the estimated value of higher accuracy can be calculated by having the filter time constant to use as different time constant for every decelerating factor.

When correcting the estimated value of the vehicle weight, the decelerating factor estimating device 1 can perform filter processing using the filter of short period to carry out the correction corresponding to the fluctuation element of the vehicle weight. Specifically, the correction can be carried out in correspondence with the fluctuation that occurs in a short period of time such as number of passengers, movement of load, and the like.

When correcting the estimated value of the air resistance coefficient, the decelerating factor estimating device 1 performs filter processing using the filter of long period to carry out the correction corresponding to the fluctuating element of the air resistance coefficient. Specifically, the correction can be carried out in correspondence with the fluctuation that occurs in a long period of time, that is, the fluctuation in which no great movement occurs for a long period of time once change is made such as replacement of vehicle exterior accessory such as aero parts, and the like.

Figure 14:
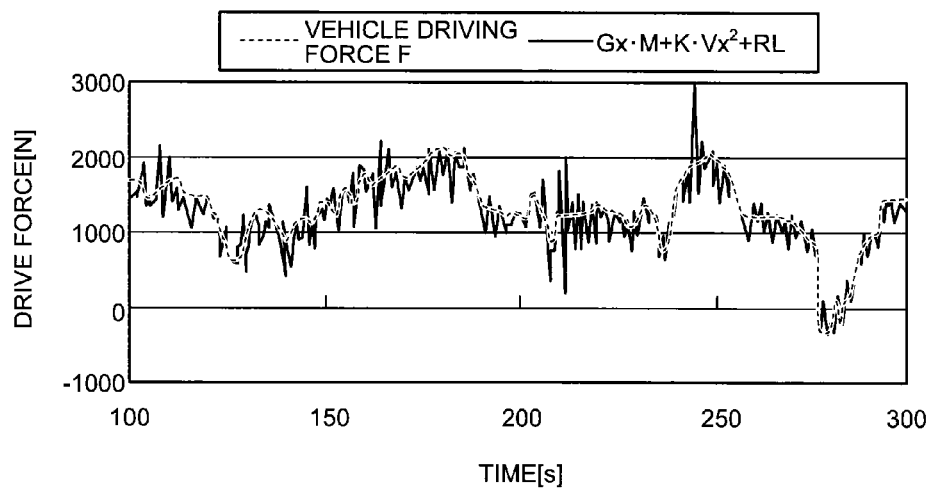
FIG. 14 is an explanatory view illustrating a relationship of the calculation result of the drive force and the time.

A case in which the drive force is calculated using a motion equation that takes the decelerating factors described above into consideration will now be described. FIG. 14 is an explanatory view illustrating a relationship of the calculation result of the drive force and the time. In FIG. 14, the vertical axis indicates the drive force [N] and the horizontal axis indicates the time [s]. In FIG. 14, the drive force (vehicle drive force) F calculated by measurement, and the drive force $(Gx \cdot M + K \cdot Vx^2 + RL)$ calculated by substituting each value to the right side of the equation (1) are illustrated. Here, $Gx \cdot M + K \cdot Vx^2 + RL$ illustrated in FIG. 14 is calculated with M as the standard weight, K as the standard air resistance coefficient, RL as the standard road load, Gx as the detection value of the acceleration sensor 11, and V as the detection value of the vehicle speed sensor 10. The standard air resistance coefficient K is calculated by air density ρ×frontal projected area S×air resistance coefficient cd. The standard road load RL is calculated from the rolling resistance Rr of the tire and the vehicle mechanical loss Mr. That is, in FIG. 14, the drive force is calculated with the decelerating factor constant, that is, with a substantially accurate value of the decelerating factor.

The value close to the actual drive force can be calculated by performing the calculation with an equation using the decelerating factor calculated at high accuracy as illustrated in FIG. 14. Therefore, the decelerating factor estimating device 1 of the present embodiment can calculate the drive force close to the actual value since the decelerating factor can be estimated at high accuracy. The decelerating factor estimating device 1 can accurately calculate the relationship of the drive force, the acceleration, and the speed at the time of traveling by enhancing the accuracy of the term of the decelerating factor in the Expression 1. Thus, prediction can be accurately carried out even when predicting the traveling behavior of the vehicle in the drive assistance. A more appropriate drive assistance can be executed since the vehicle behavior can be accurately predicted.

When using the detection value of the acceleration sensor 11, the decelerating factor estimating device 1 preferably uses the value obtained by correcting the detection value with the low pass filter for the acceleration. That is, the acceleration GxF corrected with the following Expression 8 is preferably used.

$$GxF = (1-kk) \cdot Gx_{n-1} + kk \cdot Gx_n \quad \text{(Expression 8)}$$

Figure 15:
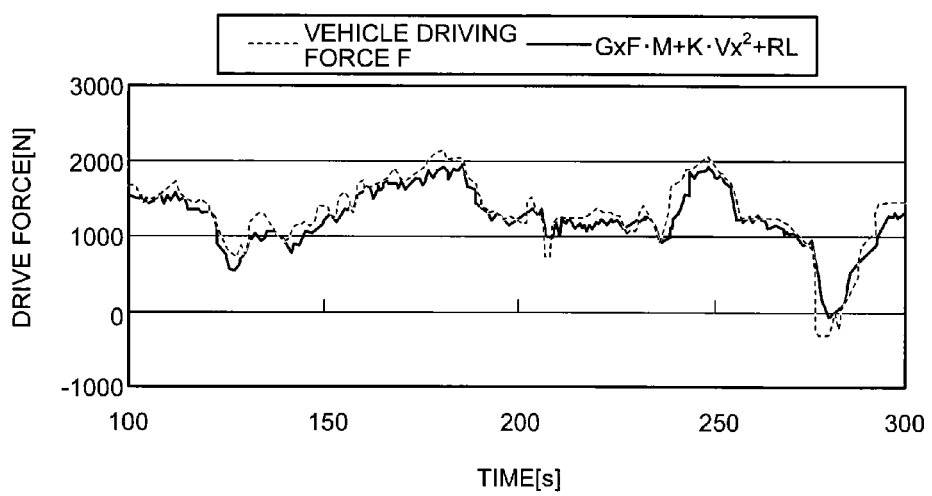
FIG. 15 is an explanatory view illustrating a relationship of the calculation result of the drive force and the time.

FIG. 15 is an explanatory view illustrating a relationship of the calculation result of the drive force and the time. In FIG. 15, the vertical axis indicates the drive force [N] and the horizontal axis indicates the time [s]. In FIG. 15, the drive force (vehicle drive force) F calculated by measurement and the drive force $(GxF \cdot M + K \cdot Vx^2 + RL)$ calculated by substituting each value to the right side of the Expression 1 are illustrated. That is, in FIG. 15, the value obtained by removing the high frequency component with the low pass filter is used for the acceleration of the drive force calculated by substituting each value to the right side of the Expression 1. As illustrated in FIG. 15, the decelerating factor estimating device 1 can estimate the decelerating factor with a value in which the noise component is removed by using the value in which the high frequency component is removed for the acceleration. Thus, the accuracy in the estimation of the decelerating factor becomes higher.

The decelerating factor estimating device 1 of the embodiment described above can calculate the decelerating factor at higher accuracy by calculating, through estimation, all three decelerating factors of the vehicle weight, the air resistance coefficient, and the road load. The decelerating factor estimating device 1 is not limited to calculating, through estimation, all three decelerating factors of the vehicle weight, the air resistance coefficient, and the road load. The decelerating factor estimating device 1 may estimate only two of the vehicle weight, the air resistance coefficient, or the road load. If estimation is not to be carried out, a preset fixed value and a design value may be used. The decelerating factor estimating device 1 can estimate the decelerating factor at higher accuracy by switching between whether to perform or not to perform the estimation of either one of the air resistance coefficient or the road load according to the traveling state.

The decelerating factor estimating device 1 determines whether or not to perform the estimation of each decelerating factor with the acceleration and the speed as the criteria for the traveling state, but the determination criteria on whether or not to perform the estimation of each decelerating factor is not limited thereto. The decelerating factor estimating device 1 may determine whether or not to perform the estimation of each decelerating factor with only one of either the acceleration or the speed as a criterion for the traveling state. The decelerating factor estimating device 1 may determine whether or not to perform the drive assistance with the drive force as a criterion for the traveling state.

The decelerating factor estimating device 1 switches between whether to execute the estimation of the vehicle weight or to execute the estimation of the road load with one threshold value (acceleration) as the criterion, and switches between whether to execute the estimation of the air resistance coefficient or to execute the estimation of the road load with one threshold value (acceleration) as the criterion, but is not limited thereto. The decelerating factor estimating device 1 may assume the threshold value for determining whether to execute the estimation of the vehicle weight and the threshold value for determining whether to execute the estimation of the road load as different accelerations. Further, the decelerating factor estimating device 1 may assume the threshold value for determining whether to execute the estimation of the air resistance coefficient and the threshold value for determining whether to execute the estimation of the road load as different speeds. The decelerating factor estimating device 1 may estimate both of the vehicle weight and the road load, or may not estimate neither the vehicle weight nor the road load at some of the acceleration. The decelerating factor estimating device 1 may estimate both of the air resistance coefficient and the road load, or may not estimate neither the air resistance coefficient nor the road load at some of the speed.

In order to further enhance the accuracy of the estimation, the decelerating factor estimating device 1 preferably switches between whether to execute the estimation of one decelerating factor of the three decelerating factors of the vehicle weight, the air resistance coefficient, and the road load according to the traveling state as in the present embodiment, but is not limited thereto. The decelerating factor estimating device 1 may constantly estimate some decelerating factors of the vehicle weight, the air resistance coefficient, and the road load regardless of the traveling state. In this case, when estimating one decelerating factor, the previous value is used for the other decelerating factor and two computations are separately executed.

The decelerating factor estimating device 1 according to the embodiment described above is not limited to the embodiment described above, and various changes can be made within the scope defined in the claims. The decelerating factor estimating device 1 according to the present embodiment may be configured by appropriately combining the configuring elements of each embodiment described above.

The decelerating factor estimating device 1 of the present embodiment has been described for a case of estimating the decelerating factor of the vehicle 2 including the engine 5 and the MG (motor generator) 6 or a so-called hybrid vehicle, but is not limited thereto. The decelerating factor estimating device 1 can similarly carry out the estimation even when assisting the traveling of the vehicle 2 that does not include the MG6 for the power source and includes only the engine 5 for the power source or a so-called conventional vehicle. Further, the decelerating factor estimating device 1 can similarly carry out the estimation even when estimating the decelerating factor of the vehicle 2 that does not include the engine 5 for the power source and includes only the motor generator for the power source, or a so-called electric automobile.

REFERENCE SIGNS LIST

1 DECELERATING FACTOR ESTIMATING DEVICE
2 VEHICLE
3 VEHICLE CONTROL SYSTEM
4 HMI DEVICE (ASSISTING DEVICE)
5 ENGINE (INTERNAL COMBUSTION ENGINE)
6 MOTOR GENERATOR, MG (ELECTRIC MOTOR)
7 TRANSMISSION
8 BRAKE DEVICE
9 BATTERY
10 VEHICLE SPEED SENSOR
11 ACCELERATION SENSOR
12 YAW RATE SENSOR
13 ACCELERATOR SENSOR
14 BRAKE SENSOR
15 GPS DEVICE
16 WIRELESS COMMUNICATION DEVICE
17 DATABASE
50 ECU
51 VEHICLE CHARACTERISTIC CALCULATING UNIT
52 STORAGE UNIT
53 DRIVE ASSISTING CONTROL UNIT
54 VEHICLE BEHAVIOR STABILITY CONTROL DETECTING UNIT
56 CAN
60 VEHICLE SPEED CALCULATING UNIT
61 ACCELERATION CALCULATING UNIT
62 DRIVE FORCE CALCULATING UNIT
63 VEHICLE WEIGHT CALCULATING UNIT
64 AIR RESISTANCE CALCULATING UNIT
65 ROAD LOAD CALCULATING UNIT
66 VEHICLE WEIGHT ABNORMALITY DETERMINING UNIT
68 ESTIMATION PROCESS CONTROL UNIT

The invention claimed is:

1. A decelerating factor estimating device comprising:
an electronic control unit (ECU) configured to:
acquire a drive force of a vehicle;
acquire a vehicle speed of the vehicle;
acquire an acceleration of the vehicle;
estimate a plurality of decelerating factors including a vehicle weight, an air resistance coefficient, and a road load based on a relationship among the drive force, the speed, and the acceleration;
determine a decelerating factor, from among the plurality of decelerating factors, to be estimated based on a traveling state of the vehicle;
at a time an estimated value of a first decelerating factor of the plurality of decelerating factors is converging, widen a range of the traveling state of the vehicle to execute an estimation process of a second decelerating factor of the plurality of decelerating factors relative to a case where the estimated value of the first decelerating factor is not converging; and
turn ON/OFF an engine of the vehicle based upon the deceleration factors.

2. The decelerating factor estimating device according to claim 1, wherein
the first decelerating factor is the air resistance coefficient, the second decelerating factor is the vehicle weight, and the ECU is configured to:
estimate the vehicle weight at a time the vehicle speed is smaller than a threshold value, and at a time the air resistance coefficient is converging, make a speed of the threshold value a higher speed than a case where the air resistance coefficient is not converging.

3. The decelerating factor estimating device according to claim 2, wherein the ECU is configured to:
estimate the air resistance coefficient at a time the acceleration is smaller than a threshold value, and
at a time the vehicle weight is converging, make an acceleration of the threshold value a higher acceleration than a case where the vehicle weight is not converging.

4. The decelerating factor estimating device according to claim 2, wherein the ECU is configured to estimate the road load at the time the vehicle speed is smaller than the threshold value.

5. The decelerating factor estimating device according to claim 2, wherein the ECU is configured to:
estimate the road load at a time the acceleration is smaller than a threshold value, and
at a time the vehicle weight is converging, make an acceleration of the threshold value a higher acceleration than a case where the vehicle weight is not converging.

6. The decelerating factor estimating device according to claim 2, wherein the ECU is configured to stop the estimation of at least one of the air resistance coefficient and the road load at a time the vehicle weight is greater than or equal to a threshold value.

7. The decelerating factor estimating device according to claim 2, wherein the ECU is configured to:
detect actuation of a vehicle behavior stability control, and
stop the estimation of the decelerating factor at a time that it is detected that the vehicle behavior stability control is actuated.

8. The decelerating factor estimating device according to claim 1, wherein
the first decelerating factor is the vehicle weight,
the second decelerating factor is the air resistance coefficient,
the ECU is configured to:
estimate the air resistance coefficient at a time the acceleration is smaller than a threshold value, and
at a time the vehicle weight is converging, make an acceleration of the threshold value a higher acceleration than a case where the vehicle weight is not converging.

9. The decelerating factor estimating device according to claim 8, wherein the ECU is configured to:
estimate the road load at a time the vehicle speed is smaller than a threshold value, and
at a time the air resistance coefficient is converging, make a vehicle speed of the threshold value a higher vehicle speed than a case where the air resistance coefficient is not converging.

10. The decelerating factor estimating device according to claim 8, wherein the ECU is configured to estimates the road load at the time the acceleration is smaller than the threshold value.

11. The decelerating factor estimating device according to claim 8, wherein the ECU is configured to stop the estimation of at least one of the air resistance coefficient and the road load at a time the vehicle weight is greater than or equal to a threshold value.

12. The decelerating factor estimating device according to claim 1, wherein
the first decelerating factor is the air resistance coefficient,
the second decelerating factor is the road load,
the ECU is configured to:
estimate the road load at a time the vehicle speed is smaller than a threshold value, and
at a time the air resistance coefficient is converging, make a vehicle speed of the threshold value a higher vehicle speed than a case where the air resistance coefficient is not converging.

13. The decelerating factor estimating device according to claim 12, wherein the ECU is configured to:
estimate the road load at a time the acceleration is smaller than a threshold value, and
at a time the vehicle weight is converging, make an acceleration of the threshold value a higher acceleration than a case where the vehicle weight is not converging.

14. The decelerating factor estimating device according to claim 12, wherein the ECU is configured to stop the estimation of at least one of the air resistance coefficient and the road load at a time the vehicle weight is greater than or equal to a threshold value.

15. The decelerating factor estimating device according to claim 1, wherein
the first decelerating factor is the vehicle weight,
the second decelerating factor is the road load,
the ECU is configured to:
estimate the road load at a time the acceleration is smaller than a threshold value, and
at a time the vehicle weight is converging, make an acceleration of the threshold value a higher acceleration than a case where the vehicle weight is not converging.

16. The decelerating factor estimating device according to claim 15, wherein the ECU is configured to stop the estimation of at least one of the air resistance coefficient and the road load of at a time the vehicle weight is greater than or equal to a threshold value.

17. The decelerating factor estimating device according to claim 1, wherein the ECU is configured to stop the estimation of at least one of the air resistance coefficient and the road load at a time the vehicle weight is greater than or equal to a threshold value.

18. The decelerating factor estimating device according to claim 1, wherein the ECU is configured to:
detect actuation of a vehicle behavior stability control, and
stop the estimation of the decelerating factor at a time that it is detected that the vehicle behavior stability control is actuated.

19. The decelerating factor estimating device according to claim 1, wherein the ECU is configured to determine the decelerating factor to be estimated based on the vehicle speed and the acceleration.

20. The decelerating factor estimating device according to claim 1, wherein the ECU is configured to:
analyze a relationship among two of the decelerating factors, the drive force, the speed, and the acceleration using a motion equation, and
estimate a remaining decelerating factor.

* * * * *